(12) United States Patent
Haick et al.

(10) Patent No.: US 11,092,563 B2
(45) Date of Patent: Aug. 17, 2021

(54) SELF-HEALING PLATFORM UNIT FOR PRESSURE AND ANALYTE SENSING

(71) Applicant: TECHNION RESEARCH & DEVELOPMENT FOUNDATION LIMITED, Haifa (IL)

(72) Inventors: Hossam Haick, Haifa (IL); Tan-Phat Huynh, Nesher (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 736 days.

(21) Appl. No.: 15/751,317

(22) PCT Filed: Aug. 15, 2016

(86) PCT No.: PCT/IL2016/050889
§ 371 (c)(1),
(2) Date: Feb. 8, 2018

(87) PCT Pub. No.: WO2017/029660
PCT Pub. Date: Feb. 23, 2017

(65) Prior Publication Data
US 2018/0231486 A1 Aug. 16, 2018

(30) Foreign Application Priority Data
Aug. 17, 2015 (IL) .......................... 240632

(51) Int. Cl.
*G01N 1/00* (2006.01)
*G01N 27/12* (2006.01)
(Continued)

(52) U.S. Cl.
CPC ............ *G01N 27/126* (2013.01); *B82Y 15/00* (2013.01); *C08K 3/08* (2013.01); *C08L 75/08* (2013.01);
(Continued)

(58) Field of Classification Search
None
See application file for complete search history.

(56) References Cited

U.S. PATENT DOCUMENTS

| 3,905,944 A | 9/1975 | Finelli |
| 8,247,524 B2 | 8/2012 | Janssen |
| (Continued) | | |

FOREIGN PATENT DOCUMENTS

| EP | 2597110 | 5/2013 |
| WO | 2009066293 | 3/2009 |
| (Continued) | | |

OTHER PUBLICATIONS

Tisch & Haick, (2010) Arrays of chemisensitive monolayer-capped metallic nanoparticles for diagnostic breath testing. Reviews in Chemical Engineering, 26(5-6), 171-179 (10 pages).
(Continued)

*Primary Examiner* — Jyoti Nagpaul
(74) *Attorney, Agent, or Firm* — Roach, Brown, McCarthy & Gruber, P.C.; Kevin D. McCarthy

(57) ABSTRACT

The present invention provides a self-healing platform unit for pressure and analyte sensing, and a method for fabrication thereof, the platform unit comprising a self-healing substrate comprising a dynamically crosslinked polymer comprising polymeric chains and crosslinking bridges; at least one self-healing electrode comprising a non-crosslinked polymer and metal microparticles dispersed therein, wherein the at least one self-healing electrode is deposited on the substrate; and at least one sensor comprising metal nanoparticles capped with an organic coating, wherein the at least one sensor is deposited on the substrate and is in electric contact with the at least one self-healing electrode.

22 Claims, 11 Drawing Sheets

(51) Int. Cl.
  *G01N 27/00* (2006.01)
  *B82Y 15/00* (2011.01)
  *C08K 3/08* (2006.01)
  *C08L 75/08* (2006.01)

(52) U.S. Cl.
  CPC ........... *G01N 27/00* (2013.01); *G01N 27/127* (2013.01); *C08K 2003/0806* (2013.01); *C08K 2003/0843* (2013.01); *C08K 2003/0862* (2013.01); *C08K 2201/005* (2013.01); *C08L 2203/16* (2013.01); *C08L 2312/00* (2013.01)

(56) References Cited

U.S. PATENT DOCUMENTS

| | | | |
|---|---|---|---|
| 8,383,697 | B2 | 2/2013 | Wilson |
| 8,679,621 | B2 | 3/2014 | Blaiszik |
| 9,080,942 | B2 | 7/2015 | Zhong |
| 9,625,341 | B2 | 4/2017 | Haick |
| 2009/0148690 | A1* | 6/2009 | Krasteva ............. B05D 1/18 428/323 |
| 2012/0062245 | A1 | 3/2012 | Bao |
| 2012/0245434 | A1 | 9/2012 | Haick |
| 2012/0245854 | A1 | 9/2012 | Haick |
| 2013/0034910 | A1 | 2/2013 | Haick |
| 2015/0082920 | A1 | 3/2015 | Haick |

FOREIGN PATENT DOCUMENTS

| | | |
|---|---|---|
| WO | 2009118739 | 5/2009 |
| WO | 2010079490 | 4/2010 |
| WO | 2010128007 | 5/2010 |
| WO | 2011148371 | 6/2011 |
| WO | 2012023138 | 1/2012 |
| WO | 2012169655 | 7/2012 |
| WO | 2013079469 | 3/2013 |
| WO | 2014116335 | 5/2014 |

OTHER PUBLICATIONS

Tisch & Haick, (2010) Nanomaterials for cross-reactive sensor arrays. MRS bulletin, 35(10), 797-803 (8 pages).
Tiwana et al., (2012) A review of tactile sensing technologies with applications in biomedical engineering. Sensors and Actuators A: Physical 179: 17-31 (15 pages).
Toohey et al., (2007) Self-healing materials with microvascular networks. Nature materials, 6(8), 581-585 (5 pages).
Vossmeyer et al., (2008) Networked Gold-Nanoparticle Coatings on Polyethylene: Charge Transport and Strain Sensitivity. Advanced Functional Materials, 18(11), 1611-1616 (6 pages).
Walker (2012) A review of technologies for sensing contact location on the surface of a display. Journal of the Society for Information Display 20(8): 413-440 (28 pages).
Wang et al., (2009) Thin film assemblies of molecularly-linked metal nanoparticles and multifunctional properties. Langmuir, 26(2), 618-632 (15 pages).
Wang et al., (2013) Self-healing chemistry enables the stable operation of silicon microparticle anodes for high-energy lithium-ion batteries. Nature chemistry, 5(12), 1042 (7 pages).
Wang et al., (2013) User-interactive electronic skin for instantaneous pressure visualization. Nature materials, 12(10), 899-904 (23 pages).
White et al., (2001) Autonomic healing of polymer composites. Nature, 409(6822), 794-797 (5 pages).
Wu et al., (2008) Self-healing polymeric materials: a review of recent developments. Progress in Polymer Science, 33(5), 479-522 (44 pages).
Wuelfing & Murray, (2002) Electron hopping through films of arenethiolate monolayer-protected gold clusters. The Journal of Physical Chemistry B, 106(12), 3139-3145 (7 pages).

Yin et al., (2011) Molecularly mediated thin film assembly of nanoparticles on flexible devices: electrical conductivity versus device strains in different gas/vapor environment. ACS nano, 5(8), 6516-6526 (11 pages).
Ying et al., (2011) Design and experiment of flexible multi-functional tactile sensors for robot skin. CAAI Transactions on Intelligence Technology 3(1): 30-41 (29 pages).
Alvares et al., (2011) Nanoparticle films as biomimetic tactile sensors. Procedia Engineering 25: 1349-1352 (5 pages).
Amamoto et al., (2012) Self-healing of covalently cross-linked polymers by reshuffling thiuram disulfide moieties in air under visible light. Advanced Materials, 24(29), 3975-3980 (6 pages).
Balazs, (2007) Modeling self-healing materials. Materials today, 10(9), 18-23 (6 pages).
Benight et al., (2013) Stretchable and self-healing polymers and devices for electronic skin. Progress in Polymer Science, 38(12), 1961-1977 (17 pages).
Bergman & Wudl, (2008) Mendable polymers. Journal of Materials Chemistry, 18(1), 41-62 (22 pages).
Bhattacharya & Chaklader, (1982) Review on metal-filled plastics. Part1. Electrical conductivity. Polymer-Plastics Technology and Engineering, 19(1), 21-51 (32 pages).
Blaiszik et al., (2010) Self-healing polymers and composites. Annual Review of Materials Research, 40, 179-211 (35 pages).
Boland (2010) Flexible electronics: Within touch of artificial skin. Nat Mater 9(10): 790-2 (2 pages).
Broza, & Haick, (2013) Nanomaterial-based sensors for detection of disease by volatile organic compounds. Nanomedicine, 8(5), 785-806 (23 pages).
Brust et al., (1994) Synthesis of thiol-derivatised gold nanoparticles in a two-phase liquid-liquid system. Journal of the Chemical Society, Chemical Communications, (7), 801-802 (3 pages).
Burattini et al., (2009) A novel self-healing supramolecular polymer system. Faraday discussions, 143, 251-264 (16 pages).
Canadell et al., (2011) Self-healing materials based on disulfide links. Macromolecules, 44(8), 2536-2541 (6 pages).
Chen et al., (2002) A thermally re-mendable cross-linked polymeric material. Science, 295(5560), 1698-1702 (6 pages).
Cheng et al., (2009) A flexible capacitive tactile sensing array with floating electrodes. Journal of Micromechanics and Microengineering 19: 115001 (11 pages).
Cordier et al., (2008) Self-healing and thermoreversible rubber from supramolecular assembly. Nature, 451(7181), 977-980 (4 pages).
Cosseddu et al., (2012) Strain Sensitivity and Transport Properties in Organic Field-Effect Transistors. IEEE Elec Dev Lett 33(1): 113-115 (4 pages).
Dovgolevsky et al., (2010) Monolayer-capped cubic platinum nanoparticles for sensing nonpolar analytes in highly humid atmospheres. The Journal of Physical Chemistry C, 114(33), 14042-14049 (8 pages).
Engel et al., (2003) Development of polyimide flexible tactile sensor skin. Journal of Micromechanics and Microengineering 13: 359-366 (8 pages).
Farcau et al., (2011) High-sensitivity strain gauge based on a single wire of gold nanoparticles fabricated by stop-and-go convective self-assembly. ACS nano, 5(9), 7137-7143 (7 pages).
Farcau et al., (2011) Monolayered wires of gold colloidal nanoparticles for high-sensitivity strain sensing. The Journal of Physical Chemistry C, 115(30), 14494-14499 (6 pages).
Farserotu et al., (2012) Smart skin for tactile prosthetics. 6th International Symposium on Medical Information and Communication Technology (ISMICT), IEEE, Mar. 25, 2012 (Mar. 25, 2012), pp. 1-8; XP032183647 (9 pages).
Fratoddi et al., (2015) Chemiresistive polyaniline-based gas sensors: A mini review. Sensors and Actuators B: Chemical, 220, 534-548 (15 pages).
Haick, (2007) Chemical sensors based on molecularly modified metallic nanoparticles. Journal of Physics D: Applied Physics, 40(23), 7173-7186 (15 pages).
Hammock et al., (2013) 25th anniversary article: the evolution of electronic skin (e-skin): a brief history, design considerations, and recent progress. Advanced materials, 25(42), 5997-6038 (42 pages).

(56) References Cited

OTHER PUBLICATIONS

Herrmann et al., (2007) Nanoparticle films as sensitive strain gauges. Applied Physics Letters, 91(18), 183105 (4 pages).

Hostetler et al., (1998) Alkanethiolate gold cluster molecules with core diameters from 1.5 to 5.2 nm: core and monolayer properties as a function of core size. Langmuir, 14(1), 17-30 (14 pages).

Hsu et al., (2011) A Locally Amplified Strain Sensor Based on a Piezoelectric Polymer and Organic Field-Effect Transistors. IEEE Transactions on Electron Devices 58(3): 910-917 (8 pages).

Huang et al., (2015) A High-Capacitance Salt-Free Dielectric for Self-Healable, Printable, and Flexible Organic Field Effect Transistors and Chemical Sensor. Advanced functional materials, 25(24), 3745-3755 (11 pages).

Joseph et al., (2007) Vapor Sensitivity of Networked Gold Nanoparticle Chemiresistors: Importance of Flexibility and Resistivity of the Interlinkage. J Phys Chem C 111(34): 12855-12859 (5 pages).

Konvalina & Haick, (2011) Effect of humidity on nanoparticle-based chemiresistors: a comparison between synthetic and real-world samples. ACS applied materials & interfaces, 4(1), 317-325 (9 pages).

Lacour et al., (2011) Elastic components for prosthetic skin. Conf Proc IEEE Eng Med Biol Soc 2011: 8373-6 (4 pages).

Lee and Nicholls (1999) Review Article Tactile sensing for mechatronics—a state of the art survey. Mechatronics 9(1): 1-31 (31 pages).

Maheshwari et al., (2006) High-Resolution Thin-Film Device to Sense Texture by Touch. Science 312(5779): 1501-1504 (5 pages).

Mannsfeld et al., (2010) Highly sensitive flexible pressure sensors with microstructured rubber dielectric layers. Nature Mater 9: 859-864 (7 pages).

Martin et al., (2014) The processability of a poly (urea-urethane) elastomer reversibly crosslinked with aromatic disulfide bridges. Journal of Materials Chemistry A, 2(16), 5710-5715 (6 pages).

Matsuzaki et al., (2008) Rubber-based strain sensor fabricated using photolithography for intelligent tires. Sensors and Actuators A: Physical 148(1): 1-9 (0 pages).

Nicolay et al., (2010) Responsive gels based on a dynamic covalent trithiocarbonate cross-linker. Macromolecules, 43(9), 4355-4361 (7 pages).

Olichwer et al., (2012) Cross-Linked Gold Nanoparticles on Polyethylene: Resistive Responses to Tensile Strain and Vapors. ACS Appl Mater Interfaces 4(11): 6151-6161 (11 pages).

Pang et al., (2012) A flexible and highly sensitive strain-gauge sensor using reversible interlocking of nanofibers. Nature Mater 11: 795-801 (7 pages).

Peng et al., (2009) Diagnosing lung cancer in exhaled breath using gold nanoparticles. Nature nanotechnology, 4(10), 669-673 (6 pages).

Rekondo et al., (2014) Catalyst-free room-temperature self-healing elastomers based on aromatic disulfide metathesis. Materials Horizons, 1(2), 237-240 (5 pages).

Rogers et al., (2009) A curvy, stretchy future for electronics. Proc Natl Acad Sci U S A 106(27): 10875-6 (3 pages).

Segev-Bar & Haick, (2013) Flexible sensors based on nanoparticles. ACS nano, 7(10), 8366-8378 (13 pages).

Segev-Bar et al., (2013) Tunable touch sensor and combined sensing platform: Toward nanoparticle-based electronic skin. ACS applied materials & interfaces, 5(12), 5531-5541 (11 pages).

Sekitani et al., (2008) A Rubberlike Stretchable Active Matrix Using Elastic Conductors. Science 321(5895): 1468-1472 (6 pages).

Shamanna et al., (2006) Micromachined integrated pressure—thermal sensors on flexible substrates. Journal of Micromechanics and Microengineering 16: 1984-1992 (10 pages).

Siffalovic et al., (2010) Towards strain gauges based on a self-assembled nanoparticle monolayer—SAXS study. Nanotechnology 21(38): 385702 (6 pages).

Someya et al., (2004) A large-area, flexible pressure sensor matrix with organic field-effect transistors for artificial skin applications. Proc Natl Acad Sci U S A 101(27): 9966-70 (5 pages).

Takei et al., (2010) Nanowire active-matrix circuitry for low-voltage macroscale artificial skin. Nature materials, 9(10), 821-826 (6 pages).

Tee et al., (2012) An electrically and mechanically self-healing composite with pressure-and flexion-sensitive properties for electronic skin applications. Nature nanotechnology, 7(12), 825-832 (8 pages).

* cited by examiner

SELF-HEALING PLATFORM UNIT FOR PRESSURE AND ANALYTE SENSING

FIELD OF THE INVENTION

The present invention is directed to a self-healing platform unit comprising a sensor comprising metal nanoparticles capped with an organic coating supported on a self-healing substrate and connected to a self-healing electrode, for detecting pressure and analyte molecules.

BACKGROUND OF THE INVENTION

Inspired by the numerous unique features of human skin, such as flexibility and multi-parameter sensing ability, including pressure, temperature, humidity and spatial sensitivity, many electronic devices, named electronic skins (e-skins), are being fabricated in an attempt to mimic the human skin. The vast majority of such devices is used as touch, tactile, or pressure sensors based on tunability of the flexible substrate or of the sensing layer [Hammock, M. L.; Chortos, A.; Tee, B. C.-K.; Tok, J. B.-H.; Bao, Z., *Adv. Mater.* 2013, 25, 5997-6038; Segev-Bar, M.; Haick, H., *ACS Nano* 2013, 7, 8366-8378].

US 2012/0062245 discloses an apparatus comprising: a dielectric structure including a plurality of elastomeric regions separated from one another by space regions, the elastomeric regions being configured and arranged, in response to pressure, to compress and thereby exhibit a changed effective dielectric constant corresponding to a state of compression of the elastomeric regions; and a sense circuit including a plurality of impedance-based sensors, each impedance-based sensor including a portion of the dielectric structure and configured and arranged to respond to the change in dielectric constant by providing an indication of the pressure applied to the dielectric structure adjacent each sensor.

Spatial sensing has also been integrated into electronic skin by several research groups [Wang, C.; Hwang, D.; Yu, Z.; Takei, K.; Park, J.; Chen, T.; Ma, B.; Javey, A., *Nat. Mater.* 2013, 12, 899-904]. Multi-functional e-skins have also been reported, which can be used for temperature and humidity sensing [Segev-Bar, M.; Landman, A.; Nir-Shapira, M.; Shuster, G.; Haick, H., *ACS Appl. Mater. Interfaces* 2013, 5, 5531-5541].

US 2015/0082920 to some of the inventors of the present invention is directed to a modular platform unit comprising a plurality of sensors for the combined sensing of pressure, temperature and humidity, wherein the sensors are composed of a layer of metallic-capped nanoparticles casted on a flexible substrate or a rigid substrate and the platform unit can be used in artificial or electronic skin applications.

Layers of metallic-capped nanoparticles (MCNPs) on flexible substrates are considered potential candidates for a new generation of highly sensitive flexible sensors (Herrmann et al., Appl. Phys. Lett. 2007, 91, 183105; Wang et al., Langmuir 2010, 26, 618-632; Wuelfing et al., J. Phys. Chem. B 2002, 106, 3139-3145; Haick, J. Phys. D 2007, 40, 7173-7186; Tisch et al., MRS Bull. 2010, 35, 797-803; Tisch et al., Rev. Chem. Eng. 2010, 26, 171-179; Vossmeyer et al., Adv. Funct. Mater. 2008, 18, 1611-1616; Farcau et al., J. Phys. Chem. C. 2011, 115, 14494-14499; and Farcau et al., ACS Nano 2011, 5, 7137-7143). The electrical properties of MCNP films exponentially depend on the inter-particle distance. Thus, deposition of the MCNPs on a flexible substrate allows modulating the resistance either by stretching or by bending the substrate. The use of metal nanoparticles capped with an organic coating for analyte sensing has also been intensively studied. WO 2009/066293, WO 2009/118739, WO 2010/079490, WO 2011/148371, WO 2012/023138, US 2012/0245434, US 2012/0245854, and US 2013/0034910 to some of the inventors of the present invention disclose apparatuses based on nanoparticle conductive cores capped with an organic coating for detecting volatile and non-volatile compounds, particularly for diagnosis of various diseases and disorders.

Recently, an additional unique property of human skin—self-healing—became very attractive, particularly for its beneficial use in environmental and physiological applications [Benigh, S. J.; Wang, C.; Tok, J. B. H.; Bao, Z., *Prog. Polym. Sci.* 2013, 38, 1961-1977; Wu, D. Y.; Meure, S.; Solomon, D., *Prog. Polym. Sci.* 2008, 33, 479-522, Blaiszik, B. J.; Kramer, S. L. B.; Olugebefola, S. C.; Moore, J. S.; Sottos, N. R.; White, S. R., *Annu. Rev. Mater. Res.* 2010, 40, 179-211]. A self-healing polymer must possess the ability to form multiple bonding interactions in and around the damaged area, creating connections between the components that make up its structure. To date, this challenge has been treated with different strategies: polymers with dynamic bonds in a supramolecular self-assembly [Rekondo et al., *Mater. Horiz.* 2014, 1, 237-240], [Martin, R.; Rekondo, A.; Luzuriaga, A. R. d.; Cabanero, G.; Grande, H. J.; Odriozola, I., *J. Mater. Chem.* A 2014, 2, 5710-5715], [1. Bergman, S. D. & Wudl, F., *J. Mater. Chem.* 18, 41-62 (2008); Chen, X. et al., *Science* 295, 1698-1702 (2002); Cordier, P., Tournilhac, F., Soulie-Ziakovic, C. & Leibler, L., *Nature* 451, 977-980 (2008)], [Tee, B. C.-K.; ChaoWang; Allen, R.; Bao, Z., *Nat. Nanotechnol.* 2012, 7, 825-832, Wang, C.; Wu, H.; Chen, Z.; McDowell, M. T.; Cui, Y.; Bao, Z., *Nat. Chem.* 2013, 5, 1042-1048] and polymers embedded with microencapsulated healing agents [White, S. R. et al., *Nature* 409, 794-797 (2001)].

WO 2013/079469 is directed to a self-healing polymer network and processes for the preparation thereof, the polymer network comprising transition metal thiolates, particularly thiolates of a transition metal that is able to self-assemble by metallophilic attractions, and more particularly Au(1), Ag(1), Cu(1) thiolates, or a mixture thereof, and, optionally, disulfide bonds, thiol and other thiolate groups.

U.S. Pat. No. 8,247,524 is directed to a supramolecular polymer comprising quadruple hydrogen bonding units within the polymer backbone, wherein at least a monomer comprising a 4H-unit is incorporated in the polymer backbone via at least two reactive groups up to four reactive groups, provided that the 4H-units are not covalently incorporated in the polymer backbone through one or more silicon-carbon bonds.

U.S. Pat. No. 8,679,621 is directed to an autonomic conductivity restoration system including a solid conductor and a plurality of particles, including a conductive fluid, a plurality of conductive microparticles, and/or a conductive material forming agent. The solid conductor has a first end, a second end, and conductivity between the first and second ends. When a crack forms between the first and second ends of the conductor, the contents of at least a portion of the particles are released into the crack.

U.S. Pat. No. 8,383,697 is directed to a composite material precursor composition including a matrix precursor, a first plurality of capsules including a liquid polymerizer, an activator, and an accelerant, wherein the liquid polymerizer polymerizes when in contact with the activator, and the accelerant is an accelerant for the polymerization of the liquid polymerizer.

However, mimicking self-healing nature of human skin is one of the most challenging problems for self-healing e-skin fabrication because a self-healing e-skin must be prepared by a bottom-up approach. Most of the studies directed to the development of self-healing e-skins were terminated at the syntheses of self-healing materials [Nicolay, R.; Kamada, J.; Wassen, A. V.; Matyjaszewski, K., *Macromolecules* 2010, 43, 4355-4361; White, S. R.; Sottos, N. R.; Geubelle, P. H.; Moore, J. S.; Kessler, M. R.; Sriram, S. R.; Brown, E. N.; Viswanathan, S., *Nature* 2001, 409, 794-797; Toohey, K. S.; Sottos, N. R.; Lewis, J. A.; Moore, J. S.; White, S. R., *Nat. Mater.* 2007, 6, 581-585; Burattini, S.; Colquhoun, H. M.; Greenland, B. W.; Hayes, W., *Faraday Discuss.* 2009, 143, 251-264]. To the best of the inventors' knowledge, only one type of self-healing conductive composites was successfully fabricated and used as a pressure-sensitive electronic conductor in e-skin [Tee, B. C.-K.; ChaoWang; Allen, R.; Bao, Z., *Nat. Nanotechnol.* 2012, 7, 825-832].

There remains an unmet need for the self-healing multi-purpose sensing devices fabricated from self-healing components, for use in electronic skin and/or chemical sensing applications.

SUMMARY OF THE INVENTION

The present invention provides a self-healing platform unit for pressure and analyte sensing using sensor technology which is based on metallic nanoparticles capped with an organic coating and a self-healing substrate and electrodes, configured to impart self-healing properties to the platform unit as a whole.

The present invention is based in part on the unexpected finding that films of metallic-capped nanoparticles deposited on a self-healing polymeric substrate also have self-healing properties. The inventors used a one-step process to prepare a novel dynamically crosslinked polymeric material, which readily reconstructs following mechanical damage under environmental conditions and in a wide range of temperatures and can therefore be used as a self-healing and flexible support to the metal nanoparticles-based sensor. Surprisingly, MCNPs film deposited on such self-healing substrate was able to rearrange, following disassociations between the film parts, even after multiple disassociation and healing cycles. The inventors further prepared a novel electrically-conductive non-crosslinked polymeric material, which surprisingly could sustain repeated mechanical damage with no significant decrease in the conductivity thereof. Said electrically-conductive material was applied to the self-healing substrate to serve as a self-healing electrode, coupled to the MCNPs sensor.

Accordingly, the present invention provides an independent platform unit, wherein each of its components has self-healing properties. Sensitivity of the self-healing platform unit of the present invention to pressure and strain was found to be highly comparable to that of e-skins known in the art. Moreover, the same sensor, deposited on the self-healing substrate, provided sensing of various volatile organic compounds (VOCs), with a detection limit of hundreds of ppb, which is comparable to the ordinary, non-healable sensors. Advantageously, analyte and pressure sensitivity of the platform unit was found to be stable under multiple cycles of the platform unit mechanical damaging and self-healing. These results provide a new avenue to tailor the self-healing and sensing properties of a modular matrix of MCNP sensors to afford their use as artificial or electronic skin.

Thus, according to a first aspect, the present invention provides a self-healing platform unit for pressure and analyte sensing, the platform unit comprising a self-healing substrate comprising a dynamically crosslinked polymer comprising polymeric chains and crosslinking bridges; at least one self-healing electrode comprising a non-crosslinked polymer and metal microparticles dispersed therein, wherein the at least one self-healing electrode is deposited on the substrate; and at least one sensor comprising metal nanoparticles capped with an organic coating, wherein the at least one sensor is deposited on the substrate and is in electric contact with the at least one self-healing electrode.

According to some embodiments, the crosslinking bridges comprise disulfide moieties. According to further embodiments, the crosslinking bridges comprise aromatic disulfide moieties. In certain such embodiments, the dynamic crosslinking of the polymeric chains can proceed through the metathesis reaction of aromatic disulfides.

According to some embodiments, the polymeric chain comprises a polyurethane. According to some embodiments, the polymeric chain comprises a poly(urea-urethane). According to further embodiments, the polymeric chain comprises a polyether backbone segment. In certain embodiments, the poly(urea-urethane) comprises a polyether backbone segment. In further embodiments, the polyether backbone segment has an average molecular weight of at least about 2000 g/mole. The polyether segment can be selected from polypropylene, polyethylene, polybutylene, and combinations thereof. Each possibility represents a separate embodiment of the invention. In some exemplary embodiments, the polyether is a polypropylene.

According to some embodiments, the polymeric chain comprises an aromatic urethane unit. In certain embodiments, poly(urea-urethane) comprises an aromatic urethane unit. In some exemplary embodiments, said aromatic urethane unit is tolylene urethane.

According to some embodiments, the polymeric chain comprises an urea unit. In certain embodiments, poly(urea-urethane) comprises an urea unit. In further embodiments, the polymeric chain is bound to the crosslinking bridge through an urea unit.

According to some embodiments, the crosslinked polymer has a glass transition temperature below −20° C.

According to some embodiments, the self-healing substrate has a thickness ranging from about 0.5 mm to about 10 mm. In other embodiments, the self-healing substrate is characterized by length and/or width in the range of about 0.1 cm to about 10 cm. It will be recognized by one of skill in the art that the geometrical parameters of the self-healing substrate can be used to control the load sensitivity of the at least one sensor and the self-healing properties of the platform unit.

According to some embodiments, the non-crosslinked polymer has an average molecular weight in the range of about 100 g/mole to about 500 g/mole. According to some embodiments, the non-crosslinked polymer has a glass transition temperature of below about −40° C.

According to some embodiments, the crosslinked polymer and the non-crosslinked polymer comprise the same polymer type. According to some embodiments, the non-crosslinked polymer comprises a polyurethane. According to further embodiments, the non-crosslinked polymer comprises a polyurethane diol. The polyurethane diol can comprise a backbone selected from the group consisting of polyolefins, polyesters, polyacrylate, polyvinylchloride, polystyrene, and polybutadiene. Each possibility represents a separate embodiment of the invention.

According to some embodiments, the metal microparticles are selected from the group consisting of Ag, Ni, Cu, Au, Pt, Al, and combinations thereof. Each possibility represents a separate embodiment of the invention. In some exemplary embodiments, said metal microparticles are silver (Ag) microparticles.

According to some embodiments, the metal microparticles have a mean particles size ranging from about 1 µm to about 20 µm. According to some embodiments, the volume ratio between the metal microparticles and the non-crosslinked polymer is from about 1:15 to about 1:2. In additional embodiments, the distribution of the microparticles in the non-crosslinked polymer is substantially uniform.

According to some embodiments, the at least one electrode has a thickness ranging from about 20 µm to about 100 µm. According to some embodiments, the at least one electrode has an electric resistivity at room temperature of less than about $1.5 \times 10^{-5}$ Ω·m.

According to some embodiments, the self-healing platform unit comprises at least two electrodes, wherein the sensor is in electric contact with the at least two electrodes. In further embodiments, the sensor is deposited between the at least two electrodes. In still further embodiments, the sensor at least partially overlays the at least two electrodes. In additional embodiments, the distance between said at least two electrodes ranges between about 0.01 mm and about 5 mm. It will be recognized by one of skill in the art that the distance between the at least two electrodes, which defines the sensing area, can be used to control the sensitivity of the at least one sensor to changes in load.

According to some embodiments, the at least one sensor comprises metal nanoparticles capped with an organic coating, which are arranged in a film configuration. According to further embodiments, the film comprises drop-cast layer of the metal nanoparticles. According to some embodiments, the film has a thickness ranging from about 1 nm to about 500 nm.

The metal nanoparticles of the sensor can be selected from the group consisting of Au, Ag, Ni, Co, Pt, Pd, Cu, Al, and combinations thereof. Each possibility represents a separate embodiment of the invention. According to some embodiments, the metal nanoparticles are metal alloys selected from the group consisting of Au/Ag, Au/Cu, Au/Ag/Cu, Au/Pt, Au/Pd, Au/Ag/Cu/Pd, Pt/Rh, Ni/Co, and Pt/Ni/Fe. Each possibility represents a separate embodiment of the invention. In some exemplary embodiments, the metal nanoparticles are gold (Au) nanoparticles.

In various embodiments, the metallic nanoparticles have a geometry selected from the group consisting of a cubic, a spherical, and a spheroidal geometry. Each possibility represents a separate embodiment of the present invention.

The organic coating of the nanoparticles can comprise compounds selected from the group consisting of alkylthiols, arylthiols, alkylarylthiols, alkylthiolates, ω-functionalized alkanethiolates, arenethiolates, (γ-mercaptopropyl)trimethyloxysilane, dialkyl disulfides and combinations and derivatives thereof. Each possibility represents a separate embodiment of the invention. In some exemplary embodiments the organic coating comprises a compound selected from 3-ethoxythiophenol, hexanethiol, decanethiol and tert-dodecanethiol. Each possibility represents a separate embodiment of the invention.

According to some embodiments, the at least one sensor is configured in a form selected from the group consisting of a capacitive sensor, a resistive sensor, a chemiresistive sensor, an impedance sensor, a field effect transistor sensor, a strain gauge, and combinations thereof. Each possibility represents a separate embodiment of the invention.

According to some embodiments, the at least one sensor is configured to detect an analyte adsorption thereon and to generate a signal in response thereto. According to some embodiments, said signal is an electrical signal. In some exemplary embodiments, the sensor is configured in a form of a chemiresistive sensor. According to further embodiments, the analyte is a VOC selected from the group consisting of benzaldehyde, hexane, hexanal, ethyl hexanol, octane, octanol, trimethylbenzene and combinations thereof. Each possibility represents a separate embodiment of the invention. In further embodiments, the self-healing platform unit provides the detection of a volatile organic compound indicative of a disease in a subject.

According to some embodiments, the self-healing substrate is substantially flexible. According to further embodiments, the at least one sensor is configured to generate an electrical signal which is proportional to the amount of deflection of the substantially flexible substrate. In some exemplary embodiments, the sensor is configured in a form of a strain gauge.

According to some embodiments, the at least one sensor comprises dual pressure and analyte sensing sensitivities. In certain such embodiments, the at least one sensor is configured in a form of a chemiresistor and a strain gauge. One of skill in the art readily understands that a signal which corresponds to changes in each of load or analyte adsorption can be extracted from a dual sensor's signal using various pre-measurement calibrations and/or post-measurement calculations using algorithms known by those of skill in the art.

In some embodiments, the self-healing platform unit comprises a plurality of sensors, such as, for example, between 2 and 20 sensors. When a plurality of sensors is used, the sensors can have different sensing properties, such as, for example some sensors are pressure sensors and other sensors are analyte sensors. Alternatively, the plurality of sensors includes sensors having dual pressure and analyte sensing sensitivities. Additionally, the sensors can have different sensitivities towards different analyte molecules. Thus, in some embodiments, the sensors comprise different types of metal nanoparticles and/or different types of capping compounds. Each possibility represents a separate embodiment of the invention. In certain embodiments, the platform unit comprises three sensors. Said sensors can comprise gold nanoparticles coated with 3-ethoxythiophenol, hexanethiol and tert-dodecanethiol.

According to some embodiments, the self-healing platform unit further comprises a detection device for measuring a change in at least one property of the at least one sensor, selected from the group consisting of resistance, conductance, alternating current (AC), frequency, capacitance, impedance, inductance, mobility, electrical potential, optical property and voltage threshold. Each possibility represents a separate embodiment of the invention.

According to some embodiments, the self-healing platform unit is configured to self-heal following mechanical damage of at least one of the self-healing substrate, the self-healing electrode or the sensor within less than about 24 hours at room temperature. According to some embodiments, the self-healing platform unit is configured to self-heal following mechanical damage of at least one of the self-healing substrate, the self-healing electrode or the sensor at a temperature range of from about −20° C. to about 40° C. According to some embodiments, the self-healing platform unit is configured to self-heal following mechanical damage of at least one of the self-healing substrate, the electrode or the sensor following more than 2 cycles of mechanical damage and healing of the platform unit. In certain embodiments, the cycles of mechanical damage and healing include mechanical damage applied to the same portion of the substrate, electrode or sensor during each cycle. The mechanical damage can include a scratch, a partial cut or a full cut. Each possibility represents a separate embodiment of the invention.

According to some embodiments, the self-healing platform unit is integrated on electronic or artificial skin surface. According to further embodiments, the self-healing platform unit provides the detection of an analyte of interest.

In some embodiments, the self-healing platform is configured for use in diagnosing or prognosing a disease selected from the group consisting of neurodegenerative diseases, proliferative diseases, renal diseases, respiratory diseases, inflammatory bowel diseases, and combinations thereof.

According to still further embodiments, the self-healing platform unit provides the detection of pressure exerted thereon. According to additional embodiments, the self-healing platform unit is configured to provide detection of temperature and/or humidity. Each possibility represents a separate embodiment of the invention.

In another aspect, the present invention provides a method for fabricating the self-healing platform unit, the method comprising: preparing the self-healing substrate; preparing a self-healing electrically conductive paste; applying said self-healing electrically conductive paste to the substrate to obtain the at least one self-healing electrode; and depositing the at least one sensor on the substrate, wherein the at least one sensor is in electric contact with the at least one self-healing electrode.

According to some embodiments, the step of preparing the self-healing substrate is a one-step process. In further embodiments, said one-step process comprises mixing polymeric chains, comprising diisocyanate terminated polyether with amine-terminated crosslinking bridge molecules, comprising aromatic disulfide moieties. According to particular embodiments, the step of preparing the self-healing substrate comprises mixing 4-aminophenyl disulfide with poly (propylene glycol), tolylene 2,4-diisocyanate terminated. According to further embodiments, the step of preparing the self-healing substrate comprises curing of the obtained mixture for at least about 36 hours at the temperature of about 75° C. to about 85° C.

According to some embodiments, the step of preparing the self-healing conductive paste comprises dispersing metal microparticles in a polyurethane diol solution and degassing under vacuum for at least about 15 minutes.

According to some embodiments, the step of applying the self-healing electrically conductive paste to the substrate comprises applying a mask to the substrate and coating the substrate with the conductive paste. The coating can be performed by a technique selected from the group consisting of doctor-blade, drop-casting, inject printing, and transfer molding. Each possibility represents a separate embodiment of the invention. In some exemplary embodiments, the coating is performed by a doctor-blade technique.

According to some embodiments, the step of depositing the at least one sensor comprises applying a solution comprising the metal nanoparticles capped with an organic coating to the substrate, wherein the concentration of said metal nanoparticles in the solution is at least about 30 mg/mL. In further embodiments, the step of depositing the at least one sensor comprises applying the metal nanoparticles capped with an organic coating to the substrate by a technique selected from the group consisting of drop-casting, spin coating, spray coating, field enhanced or molecular-interaction-induced deposition, Langmuir-Blodgett, Langmuir-Schaefer, soft lithography, inject printing and combinations thereof. Each possibility represents a separate embodiment of the invention. In some exemplary embodiments, the sensor is deposited on the substrate by drop-casting from solution of the metal nanoparticles capped with an organic coating.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1A:
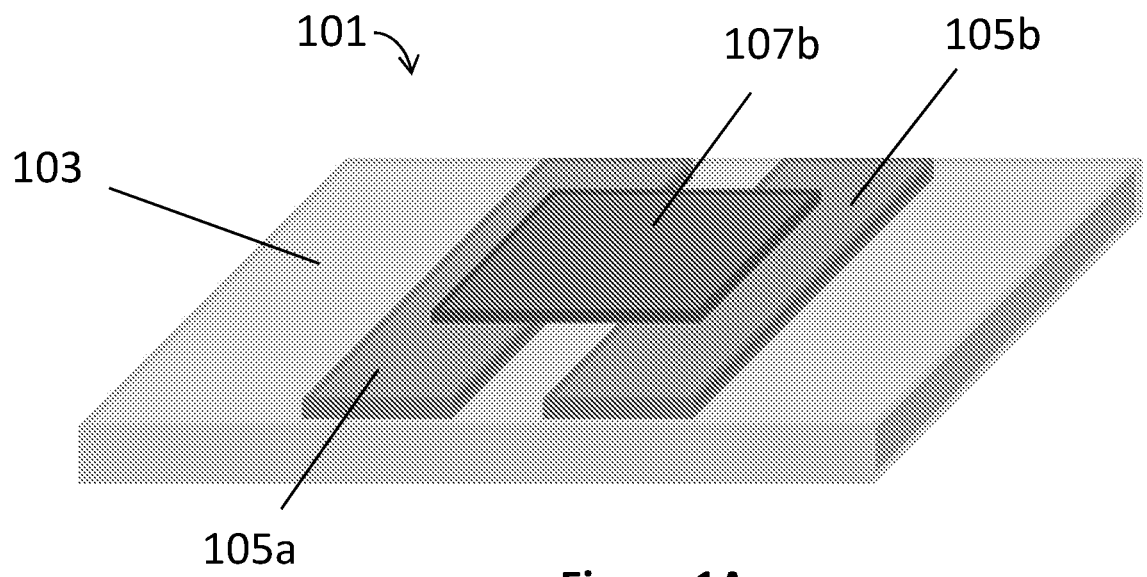
FIG. 1A: Schematic representation of the self-healing platform unit comprising the self-healing substrate, the self-healing electrodes and the sensor.

The present invention provides a modular matrix or platform unit for the concurrent detection of pressure and analyte molecules, wherein each component of the platform unit is configured to self-heal following mechanical damage. In particular, provided herein is a platform unit comprising a MCNP-based sensor supported on a self-healing substrate and electrically connected to a self-healing electrode. Said platform unit was shown to retain the sensitivity thereof in pressure and analyte sensing at a wide range of temperatures (from −20° C. to 40° C.) and following multiple disassociation and healing cycles.

The present invention is based in part on the unexpected finding that MCNP-based sensor deposited on a self-healing polymeric substrate also possesses self-healing properties. The self-healing substrate suitable for use in the platform unit of the present invention is a highly elastic polymer, which is able to recombine following unidimensional deformation. It has been found by the inventors of the present invention that in contrast to the previously reported attempts to produce electrically and mechanically self-healing pressure sensors, which included incorporation of the metallic conductive particles into the bulk of the self-healing polymer, deposition of metallic nanoparticles on the self-healing substrate surface imparted self-healing properties to the MCNP sensor. Without wishing to being bound by theory or mechanism of action, the self-healing ability of the MCNP sensor deposited on the self-healing polymeric substrate is based on two phenomena. The first is the reformation of the dynamic crosslinking bonds of the self-healing substrate and the second is the rearrangement of the nanoparticle sensing film deposited on the self-healing substrate. Sensitivity of said sensor supported on a self-healing polymeric substrate to pressure (0.108 gF$^{-1}$) and strain (22.04 mm$^{-1}$) is highly comparable to non self-healable electronic skins. Moreover, the nanometric nature of the metallic conductive particles of the sensor and surface functionalization with various organic ligands advantageously allows detection of analyte molecules with a detection limit comparable to that of the ordinary sensors. The present invention therefore provides for the first time a self-healing platform unit comprising a MCNP sensor supported on a self-healing polymeric substrate, which has dual pressure and analyte sensing ability.

Additional component of the self-healing platform unit of the present invention is a self-healing conductive electrode, which is electrically connected to the sensor. The electrode is configured to self-heal following mechanical damage to the platform unit and to be sufficiently conductive to transmit the electric signal generated by the sensor in response to the pressure applied or analyte adsorbed thereon. A novel self-healing electrode was developed, which specific composition and concentration of the constituents provided high elasticity resulting in self-healing ability without compromising electric conductivity of the electrode. Conductivity of said electrode remained sufficiently high even following multiple cycles of disassociation and healing. Without wishing to being bound by theory or mechanism of action, the choice of the electrode ingredients further afforded for the good adhesion between the electrode and the self-healing substrate, thereby imparting additional mechanical stability to the platform unit.

It is to be understood that each component of the self-healing platform unit of the present invention has self-healing properties. The response to mechanical damage (e.g. scratches and cuts) including physical appearance and electrical conductivity of each component of the sensor was carefully analyzed under multiple cycles and types of damage. Sensitivity of the platform unit in pressure (including load and strain) and analyte sensing as a function of the applied mechanical damage and following healing was also tested. The analysis revealed that the platform unit sustained the sensitivity thereof towards pressure and analyte sensing even after three cycles of cutting of the platform unit followed by spontaneous reconstruction thereof.

The present invention therefore provides MCNP-based sensing platform unit with excellent sensitivity to load and strain, which enables its use as "touch" sensors, and to ppb concentrations of analyte molecules. The self-healing nature of the sensing unit allows its application under mechanically unstable operation conditions, or where the replacement of the sensor is difficult or highly expensive. Additionally, the self-healing platform unit is non-toxic and therefore can be utilized in electronic or artificial skins or portable chemical analysis, where it can be attached to human skin. Another advantage to the present invention stems from the low-cost fabrication, since the polymeric materials of the platform unit are based on commercially available polymers or oligomers, and the ability to manufacture self-healing microscale sensing units having high spatial resolution in mass production.

Thus, according to a first aspect, the present invention provides a self-healing platform unit for pressure and analyte sensing, wherein the main components of the platform unit include a self-healing substrate comprising a dynamically crosslinked polymer comprising polymeric chains and crosslinking bridges; at least one self-healing electrode comprising a non-crosslinked polymer and metal microparticles dispersed therein, wherein the at least one self-healing electrode is deposited on the substrate; and at least one sensor comprising metal nanoparticles capped with an organic coating, wherein the at least one sensor is deposited on the substrate and is in electric contact with the at least one self-healing electrode. In another aspect, there is provided a method for fabricating the self-healing platform unit, the method comprising the steps of preparing the self-healing substrate; preparing a self-healing electrically conductive paste; depositing the self-healing electrically conductive paste on the substrate, thereby obtaining the at least one self-healing electrode; and depositing the at least one sensor on the substrate, wherein the at least one sensor is in electric contact with the at least one self-healing electrode.

The term "self-healing", as used herein, refers in some embodiments to the ability of material to spontaneously physically recombine following mechanical damage. According to the principles of the present invention, the self-healing materials and/or components of the platform unit spontaneously physically recombine following mechanical damage. In further embodiments, the term "self-healing" refers to the ability of material to retain the electrical conductivity thereof following mechanical damage. In some embodiments, the self-healing materials and/or components of the platform unit retain at least about 50% of the electrical conductivity thereof following mechanical damage. In further embodiments, the self-healing materials and/or components of the platform unit retain at least about 60%, 70%, 80%, 90% or 95% of the electrical conductivity thereof following mechanical damage. In a certain embodiment, the at least one self-healing electrode retains at least about 50% 60%, 70%, 80%, 90% or 95% of the electrical conductivity thereof following mechanical damage. In another embodiment, the sensor retains at least about 50%, 60%, 70%, 80%, 90% or 95% of the electrical conductivity thereof following mechanical damage. Each possibility represents a separate embodiment of the invention.

In particular embodiments, the term "self-healing" refers to the ability of the platform unit to retain the sensitivity thereof in pressure and/or analyte sensing following mechanical damage. In some embodiments, the platform unit retains at least about 50% of the sensitivity thereof following mechanical damage. In further embodiments, the platform unit retains at least about 60%, 70%, 80%, 90% or 95% of the sensitivity thereof following mechanical damage. The sensitivity can include pressure or analyte sensing sensitivity. Each possibility represents a separate embodiment of the invention.

The term "mechanical damage", as used in some embodiments, refers to a partial or full disassociation between two parts of the material and/or component of the self-healing platform unit. Mechanical damage applied to the self-healing platform unit may include, but not limited to, a scratch, a partial cut or a full cut. The term "scratch", as used herein refers to a disassociation depth of up to about 10% of the material and/or component thickness. The term "partial cut", as used herein refers to a disassociation depth of above about 10% but less than 100% of the material and/or component thickness. The term "full cut", as used herein refers to a disassociation depth of 100% of the material and/or component thickness. Mechanical damage can include multiple cycles of mechanical damage. In some embodiments, mechanical damage is caused to the same portion of the platform unit component during each cycle. In other embodiments, mechanical damage is caused to a different portion of the platform unit component during each cycle. In additional embodiments, mechanical damage is caused to a different platform unit component during each cycle.

The terms "spontaneous" or "spontaneously", as used herein, refer to the type of process, which does not require application of energy such as, for example, heating, or a promoter, such as, for example, a catalyst, to occur.

The term "crosslinking", as used herein, refers to covalent bonds formed between the polymeric chains of the polymer via the crosslinking bridges. The term "dynamic crosslinking", as used herein, refers to covalent bonds formed between the polymeric chains of the polymer, which can be cleaved and spontaneously reformed.

FIG. 1A schematically illustrates one of the possible configurations of the self-healing platform unit. Platform unit 101 comprises self-healing substrate 103, self-healing electrodes 105a and 105b and sensor 107. Sensor 107 is deposited on self-healing substrate 103 between self-healing electrodes 105a and 105b. Sensor 107 contacts self-healing electrodes 105a and 105b, and partially overlays the electrodes, thereby being electrically connected to them.

Self-Healing Substrate

Various spontaneously self-healing polymers are known in the art, based, for example, on embedded microencapsulated healing agents, supramolecular self-assembly, transition metal thiolates or aromatic disulfides interactions. The self-healing of such polymers can proceed, inter alia, through dissociation and recombination of dynamic covalent or weak hydrogen bonds at a room temperature. According to some currently preferred embodiments, the self-healing substrate of the platform unit is a dynamically covalently crosslinked polymer, which crosslinking bridges comprise disulfide moieties. According to further embodiments, the self-healing polymeric substrate is crosslinked through aromatic disulfide moieties. In certain such embodiments, the dynamic crosslinking of the polymeric chains can proceed through the metathesis reaction of aromatic disulfides.

The polymeric chains of the self-healing crosslinked polymer should be selected to provide flexibility, load sensitivity, mechanical strength, and healability to the substrate According to some embodiments, the polymeric chain comprises a polyurethane. The polymeric chain can further comprise an urea unit. Thus, in some embodiments, the polymeric chain comprises a poly(urea-urethane).

According to further embodiments, the polymeric chain comprises a polyether backbone segment. Without wishing to being bound by theory or mechanism of action, the polyether backbone provides flexibility to the self-healing polymer. In certain embodiments, the poly(urea-urethane) comprises a polyether backbone segment. In further embodiments, the polyether backbone segment has an average molecular weight of at least about 2000 g/mole. In additional embodiments, the average molecular weight of the polyether backbone segment is in the range of about 2000 to 10,000 g/mole. In certain embodiments, the average molecular weight is from about 2000 to about 6000 g/mole. The polyether segment can be selected from polypropylene, polyethylene, or polybutylene. Each possibility represents a separate embodiment of the invention. In some exemplary embodiments, the polyether is a polypropylene.

According to some embodiments, the polymeric chain comprises an aromatic urethane unit. In certain embodiments, poly(urea-urethane) comprises an aromatic urethane unit. In some exemplary embodiments, said aromatic urethane unit is tolylene urethane.

According to some embodiments, the polymeric chain comprises an urea unit. In certain embodiments, poly(urea-urethane) comprises an urea unit. In further embodiments, the polymeric chain is covalently bound to the crosslinking bridge through an urea unit. According to some embodiments, the polymeric chains are further dynamically connected via hydrogen bonds between the urea units of the polymeric chains.

According to some embodiments, the crosslinked polymer has a glass transition temperature below ambient temperature. According to some embodiments, the crosslinked polymer has a glass transition in the range of 0° C. to −80° C. According to some embodiments, the crosslinked polymer has a glass transition in the range of −15° C. to −75° C. According to some embodiments, the crosslinked polymer has a glass transition in the range of −30° C. to −70° C. According to some embodiments, the crosslinked polymer has a glass transition in the range of −45° C. to −65° C. According to some embodiments, the crosslinked polymer has a glass transition temperature of about −55° C.

According to some embodiments, the self-healing substrate is substantially flexible. The term "substantially flexible" as used herein refers to a substrate which is configured to elastically deform in response to pressure, wherein said deformation is proportional to the amount of applied pressure. In certain embodiments, the deformation of the substrate generates a change in conformation of the metal nanoparticles capped with an organic coating. The change in conformation or structural displacement of the metal nanoparticles capped with an organic coating supported on the substrate generates an electrical signal which is proportional to the amount of applied pressure. Thus, in some embodiments, the MCNP sensor is configured as a strain gauge which translates the mechanical deflection into an electrical signal. It is further contemplated that the substantially flexible substrate enables the load sensitivity of the platform unit even following mechanical damage.

The self-healable substrate can have any desirable geometry. In rectangular geometries, the length and/or width of the substantially flexible substrate ranges between about 0.01-10 cm. The thickness of the substrate can further be tuned, typically in the range of about 0.5-10 mm. The present invention provides the modulation of load sensitivities by changing the width of the self-healing substrate. In addition, the present invention provides the modulation of the gauge factor by adjusting the substrate thickness. Thus, it is contemplated that by modifying the geometrical characteristics of the substrate, desirable load sensitivity and strain gauge factor can be obtained.

In an additional aspect the invention provides a self-healing polymer, comprising poly(urea-urethane) polymeric chains, comprising a tolylene urethane unit, and crosslinking bridges, comprising disulfide aromatic moieties. According to further embodiments, the self-healing polymer comprises a polyether backbone, preferably a polypropylene glycol backbone. Said self-healing polymer can be used as a self-healing substrate in pressure and/or analyte sensors.

Self-Healing Electrode

The self-healing platform unit comprises at least one self-healing electrode which is in electric contact with the sensor. The term "self-healing electrode", as used herein, refers to an electrically conductive element, having self-healing properties. The self-healing electrode, which is coupled to the sensor enables the measurement and transmittance of the electric signals generated by the sensor. The self-healing electrodes may include a source and a drain electrode separated from one another by a source-drain gap. The self-healing electrodes may further comprise a gate electrode wherein the electrical signal may be indicative of a certain property of the capped nanoparticles (e.g. a change in conformation of the capped nanoparticles) under the influence of a gate voltage.

According to the principles of the present invention, the self-healing electrode comprises a non-crosslinked polymeric material comprising microparticles dispersed therein. The non-crosslinked polymer was found to allow distribution of the metal microparticles in the bulk of the polymer. In some currently preferred embodiments, the distribution of the microparticles in the non-crosslinked polymer is substantially uniform. The term "uniform distribution", as used herein denotes that the volume percentage of the metal microparticles varies from one portion of the electrode to another by less than about 40%, less than about 20% or less than about 10%. Each possibility represents a separate embodiment of the invention. The different portions of the electrode may refer to bulk vs surface or to different segments of the electrode along a longitudinal axis thereof. The uniformity of the metal microparticle distribution in the self-healing electrode can be measured by a technique selected from scanning electron microscopy (SEM), transmission electron microscopy (TEM), atomic force microscopy (AFM), or energy-dispersive X-ray spectroscopy (EDX). Each possibility represents a separate embodiment of the invention.

It was surprisingly found that dispersing a relatively low concentration of the metal microparticles in the non-crosslinked polymer provided a self-healable electrode having sufficient electric conductivity, which allows the use thereof in the self-healing platform unit. Accordingly, the use of the non-crosslinked polymer for the preparation of the self-healing electrode provided high conductivity, without compromising the self-healing properties of the polymeric material. In contrast, incorporation of the similar amount of the metal nanoparticles into a crosslinked polymer provided a material which did not have self-healing properties. Furthermore, the combination of the crosslinked polymeric substrate and the non-crosslinked polymeric electrode according to the principles of the present invention provided excellent adhesion between the electrode and the substrate, ensuring mechanical stability for the long-term use. According to further embodiments, the crosslinked polymer and the non-crosslinked polymer comprise the same polymer type.

According to some embodiments, the non-crosslinked polymer has an average molecular weight in the range of about 100 to about 500 g/mole. In certain embodiments, the non-crosslinked polymer has an average molecular weight of below about 700 g/mole, 600 g/mole, 500 g/mole, or 400 g/mole. Each possibility represents a separate embodiment of the invention. Without wishing to being bound by theory or mechanism of action, the low molecular weight of the non-crosslinked polymer allows dynamic flow and easier recombination of the self-healing electrode following mechanical damage.

The non-crosslinked polymers suitable for the preparation of the self-healable electrodes according to the principles of the present invention are characterized by a low glass transition temperature (Tg). According to some embodiments, the non-crosslinked polymer has a glass transition temperature of below about −40° C. According to further embodiments, the non-crosslinked polymer has a glass transition temperature of below about −50° C. According to still further embodiments, the non-crosslinked polymer has a glass transition temperature of below about −60° C.

According to some embodiments, the non-crosslinked polymer comprises a polyurethane. According to further embodiments, the non-crosslinked polymer comprises a polyurethane diol. The polyurethane diol can comprise a backbone selected from the group consisting of polyolefins, polyesters, polyacrylate, polyvinylchloride, polystyrene, and polybutadiene. Without wishing to being bound by theory or mechanism of action, polyurethane has a high density of hydrogen bonds between polymeric chains thereof, which induce the self-healing of the polymer. Without further wishing to being bound by theory or mechanism of action, the self-healing of the electrodes according to the principles of the present invention proceeds through dissociation and association of hydrogen bonds between the urethane and/or hydroxyl groups. According to some embodiments, the non-crosslinked polymer does not include urea units.

In certain embodiments, the crosslinked polymer of the substrate and the non-crosslinked polymer of the electrode are polyurethane-based polymers.

According to the principles of the present invention, the conductivity of the self-healing electrode is afforded by the metal microparticles dispersed in the non-crosslinked polymer. According to some embodiments, the metal microparticles are selected from Ag, Ni, Cu, Au, Pt, Al, Zn, Fe, and combinations thereof. Each possibility represents a separate embodiment of the invention. In some exemplary embodiments, said metal microparticles are silver (Ag) microparticles.

The term "microparticles" should be understood to include particles having a mean particle size in the range of above 1 μm but below 1000 μm.

The term "particle size", as used in various embodiments of the invention, refers to the length of the particle in the longest dimension thereof.

According to some embodiments, the metal microparticles have a mean particle size ranging from about 1 to about 20 μm. In further embodiments, the mean particle size is in the range of about 1 to about 15 μm or of about 5 to about 10 μm. Each possibility represents a separate embodiment of the invention.

According to some embodiments, the volume ratio between the metal microparticles and the non-crosslinked polymer is from about 1:15 to about 1:2. In further embodiments, the volume ratio is from about 1:12 to about 3:7. In still further embodiments, the volume ratio is from about 1:9 to about 3:7. In still further embodiments, the volume ratio is from about 2:7 to about 4:7. In still further embodiments, the volume ratio is about 3:7. Without wishing to being bound by theory or mechanism of action, substantially lower or higher volume ratios between the metal nanoparticles and the non-crosslinked polymer produce an electrode, which is not sufficiently conductive or self-healable.

According to some embodiments, the at least one electrode has an electric resistivity at room temperature of less than about $1.5 \times 10^{-5}$ Ω·m. In further embodiments, the at least one electrode has an electric resistivity at room temperature of less than about $1.25 \times 10^{-5}$ Ω·m or of less than about $1.0 \times 10^{-5}$ Ω·m.

According to some embodiments, the at least one electrode has a thickness ranging from about 20 μm to about 100 μm. In further embodiments, the electrode has a thickness of from about 30 μm to about 90 μm, from about 40 μm to about 80 μm, or from about 50 μm to about 70 μm. Each possibility represents a separate embodiment of the invention.

According to some embodiments, the self-healing platform unit comprises at least two electrodes, wherein the sensor is in electric contact with the at least two electrodes. According to some embodiments, the sensor at least partially overlays the at least two electrodes. The distance between the at least two electrodes can define the sensing area. Accordingly, different configurations of the electrodes in the platform unit may be fabricated as is known in the art. Typically, the distance between adjacent electrodes in each sensor ranges between about 0.01-5 mm. In further embodiments, the distance ranges between about 0.1-1 mm. In some exemplary embodiments, the distance is about 0.5 mm.

The self-healing electrode can further include interconnecting wiring, preferably a metal wiring.

In an additional aspect, the invention provides a self-healing electrically conductive polymeric material, comprising a non-crosslinked polymer comprising a polyurethane diol and metal microparticles dispersed therein. According to further embodiments, the non-crosslinked polymer has an average molecular weight in the range of about 100 to about 500 g/mole. According to still further embodiments, the volume ratio between the metal microparticles and the non-crosslinked polymer is from about 1:15 to about 1:2. Said self-healing electrically conductive material can be used as a self-healing electrode in pressure and/or analyte sensors.

Pressure and Analyte Sensor

According to the principles of the present invention, the platform unit provides the detection of pressure and/or analyte molecules, including volatile organic compounds. In some embodiments, the platform unit provides the concurrent detection of pressure and analytes. The sensing of the analyte molecules in addition to the pressure sensing is afforded by the metal nanoparticles capped by various organic ligands. Thus, the platform unit comprises at least one sensor comprising a plurality of metal nanoparticles capped with an organic coating. In certain embodiments, the platform unit comprises a plurality of sensors. In further embodiments, each sensor comprises a plurality of metal nanoparticles capped with different organic coatings. Suitable metal nanoparticles within the scope of the present invention include, but are not limited to Au, Ag, Ni, Co, Pt, Pd, Cu, Al, Zn, Fe, and combinations thereof, including metal alloys such as, but not limited to Au/Ag, Au/Cu, Au/Ag/Cu, Au/Pt, Au/Pd, Au/Ag/Cu/Pd, Pt/Rh, Ni/Co, and Pt/Ni/Fe. Each possibility represents a separate embodiment of the present invention.

The metal nanoparticles may have any desirable geometry including, but not limited to a cubic, a spherical, and a spheroidal geometry. Each possibility represents a separate embodiment of the present invention.

The term "nanoparticles" should be understood to include particles having a mean particle size in the range of above 0.5 nm but below 1000 nm.

According to some embodiments, the metal nanoparticles have a mean particle size in the range of about 1 nm to about 10 nm. In further embodiments, the metal nanoparticles have a mean particle size in the range of about 2 nm to about 6 nm.

The organic coating of the metal nanoparticles comprises a monolayer or multilayers of organic molecules. Suitable coating includes, but is not limited to alkylthiols, e.g., alkylthiols with $C_3$-$C_{24}$ chains, arylthiols, alkylarylthiols, alkenyl thiols, alkynyl thiols, cycloalkyl thiols, heterocyclyl thiols, heteroaryl thiols, alkylthiolates, alkenyl thiolates, alkynyl thiolates, cycloalkyl thiolates, heterocyclyl thiolates, heteroaryl thiolates, ω-functionalized alkanethiolates, arenethiolates, (γ-mercaptopropyl)tri-methyloxysilane, dialkyl disulfides and combinations thereof. Each possibility represents a separate embodiment of the present invention.

An "alkyl" group refers to a saturated aliphatic hydrocarbon, including straight-chain, branched-chain and cyclic alkyl groups. In one embodiment, the alkyl group has 1-12 carbons designated here as $C_1$-$C_{12}$-alkyl. In another embodiment, the alkyl group has 2-6 carbons designated here as $C_2$-$C_6$-alkyl. In another embodiment, the alkyl group has 2-4 carbons designated here as $C_2$-$C_4$-alkyl. In a currently preferred embodiment, the alkyl group has 3-24 carbons designated here as $C_3$-$C_{24}$ alkyl. The alkyl group may be unsubstituted or substituted by one or more groups selected from alcohol, ketone, aldehyde, halogen, carbonate, carboxylate, carboxylic acid, acyl, amido, amide, amine, imine, ester, ether, cyano, nitro, and azido. Each possibility represents a separate embodiment of the present invention.

A "cycloalkyl" group refers to a non-aromatic mono- or multicyclic ring system. In one embodiment, the cycloalkyl group has 3-10 carbon atoms. In another embodiment, the cycloalkyl group has 5-10 carbon atoms. Exemplary monocyclic cycloalkyl groups include cyclopentyl, cyclohexyl, cycloheptyl and the like. An alkylcycloalkyl is an alkyl group as defined herein bonded to a cycloalkyl group as defined herein. The cycloalkyl group can be unsubstituted or substituted with any one or more of the substituents defined above for alkyl.

An "alkenyl" group refers to an aliphatic hydrocarbon group containing at least one carbon-carbon double bond including straight-chain, branched-chain and cyclic alkenyl groups. In one embodiment, the alkenyl group has 2-8 carbon atoms (a $C_{2-8}$ alkenyl). In another embodiment, the alkenyl group has 2-4 carbon atoms in the chain (a $C_{2-4}$ alkenyl). Exemplary alkenyl groups include ethenyl, propenyl, n-butenyl, i-butenyl, 3-methylbut-2-enyl, n-pentenyl, heptenyl, octenyl, cyclohexyl-butenyl and decenyl. An alkylalkenyl is an alkyl group as defined herein bonded to an alkenyl group as defined herein. The alkenyl group can be unsubstituted or substituted through available carbon atoms with one or more groups defined hereinabove for alkyl.

An "alkynyl" group refers to an aliphatic hydrocarbon group containing at least one carbon-carbon triple bond including straight-chain and branched-chain. In one embodiment, the alkynyl group has 2-8 carbon atoms in the chain (a $C_{2-8}$ alkynyl). In another embodiment, the alkynyl group has 2-4 carbon atoms in the chain (a $C_{2-4}$ alkynyl). Exemplary alkynyl groups include ethynyl, propynyl, n-butynyl, 2-butynyl, 3-methylbutynyl, n-pentynyl, heptynyl, octynyl and decynyl. An alkylalkynyl is an alkyl group as defined herein bonded to an alkynyl group as defined herein. The alkynyl group can be unsubstituted or substituted through available carbon atoms with one or more groups defined hereinabove for alkyl.

An "aryl" group refers to an aromatic monocyclic or multicyclic ring system. In one embodiment, the aryl group has 6-10 carbon atoms. The aryl is optionally substituted with at least one "ring system substituents" and combinations thereof as defined herein. Exemplary aryl groups include phenyl or naphthyl. An alkylaryl is an alkyl group as defined herein bonded to an aryl group as defined herein. The aryl group can be unsubstituted or substituted through available carbon atoms with one or more groups defined hereinabove for alkyl.

A "heteroaryl" group refers to a heteroaromatic system containing at least one heteroatom ring wherein the atom is selected from nitrogen, sulfur and oxygen. The heteroaryl contains 5 or more ring atoms. The heteroaryl group can be monocyclic, bicyclic, tricyclic and the like. Also included in this definition are the benzoheterocyclic rings. Non-limiting examples of heteroaryls include thienyl, benzothienyl, 1-naphthothienyl, thianthrenyl, furyl, benzofuryl, pyrrolyl, imidazolyl, pyrazolyl, pyridyl, pyrazinyl, pyrimidinyl, pyridazinyl, indolyl, isoindolyl, indazolyl, purinyl, isoquinolyl, quinolyl, naphthyridinyl, quinoxalinyl, quinazolinyl, cinnolinyl, pteridinyl, carbolinyl, thiazolyl, oxazolyl, isothiazolyl, isoxazolyl and the like. The heteroaryl group can be unsubstituted or substituted through available atoms with one or more groups defined hereinabove for alkyl.

A "heterocyclic ring" or "heterocyclyl" group refers to five-membered to eight-membered rings that have 1 to 4 heteroatoms, such as oxygen, sulfur and/or in particular nitrogen. These five-membered to eight-membered rings can be saturated, fully unsaturated or partially unsaturated, with fully saturated rings being preferred. Exemplary heterocyclic rings include piperidinyl, pyrrolidinyl pyrrolinyl, pyrazolinyl, pyrazolidinyl, morpholinyl, thiomorpholinyl, pyranyl, thiopyranyl, piperazinyl, indolinyl, dihydrofuranyl, tetrahydrofuranyl, dihydrothiophenyl, tetrahydrothiophenyl, dihydropyranyl, tetrahydropyranyl, and the like. An alkylheterocyclyl is an alkyl group as defined herein bonded to a heterocyclyl group as defined herein. The heterocyclyl group can be unsubstituted or substituted through available atoms with one or more groups defined hereinabove for alkyl.

"Ring system substituents" refer to substituents attached to aromatic or non-aromatic ring systems including, but not limited to, H, halogen, haloalkyl, $(C_1-C_8)$alkyl, $(C_2-C_8)$ alkenyl, $(C_2-C_8)$alkynyl, $(C_6-C_{10})$aryl, alcohol, ketone, aldehyde, carbonate, carboxylate, carboxylic acid, acyl, amido, amide, amine, imine, ester, ether, cyano, nitro, azido, and the like. Each possibility represents a separate embodiment of the present invention.

Exemplary organic coating includes, but is not limited to 3-ethoxythiophenol, hexanethiol, decanethiol and tert-dodecanethiol. Each possibility represents a separate embodiment of the invention.

In various embodiments, the organic coating is characterized by a thickness ranging from about 1 nm to about 500 nm, such as, for example, from about 1 nm to about 100 nm, from about 100 nm to about 200 nm, from about 200 nm to about 300 nm, from about 300 nm to about 400 nm, or from about 400 nm to about 500 nm.

In some embodiments, the self-healing sensor comprises continuous and discontinuous regions of metal nanoparticles capped with an organic coating. In one embodiment, the discontinuous regions comprise voids ranging in size from about 10 nm to about 500 nm. In another embodiment, the discontinuous regions comprise between about 3% and about 90% voids.

The sensor of the present invention can be configured as any one of the various types of electronic devices, including, but not limited to capacitive sensors, resistive sensors, chemiresistive sensors, impedance sensors, field effect transistor sensors, strain gauge sensors and the like, or combinations thereof. Each possibility represents a separate embodiment of the present invention. In a non-limiting example, the sensors of the present invention are configured as chemiresistive sensors (i.e. chemiresistors) and as a strain gauge.

In some embodiments, the sensor is configured to sense pressure applied thereon and to generate a signal in response thereto. In some embodiments, the sensor is configured to sense adsorption of the analyte molecule thereon and to generate a signal in response thereto. In some embodiments, said signal is an electric signal. The signal which is generated by the sensor may comprise, according to the principles of the present invention a change in any one or more of conductivity, resistance, impedance, capacitance, inductance, or optical properties of the sensor.

In some embodiments, the signal is produced by the swelling of the assembly of capped nanoparticles in response to the adsorption of the analyte molecules. As used herein, the term "swelling" refers to an increase of the average inter-particle distance in the assembly of capped nanoparticles. In other embodiments, the signal is produced by the aggregation of the assembly of capped nanoparticles in response to the adsorption of the analyte molecules. As used herein, the term "aggregation" refers to a decrease of the average inter-particle distance in the assembly of capped nanoparticles. In certain embodiments, the analyte molecules include volatile organic compounds.

The self-healing platform unit is thus configured to provide the detection of the presence and concentration of the analyte molecules in the surrounding environment. The non-limiting examples of analytes, which can be detected by the self-healing platform unit include VOCs selected from benzaldehyde, hexane, hexanal, ethyl hexanol, octane, octanol and trimethylbenzene. Various VOCs are indicative of different diseases. Thus, the self-healing platform unit can provide the detection of a volatile organic compound indicative of a disease, a disorder or a condition in a subject. The non-limiting examples of such diseases include neurodegenerative diseases, proliferative diseases, renal diseases, respiratory diseases, and inflammatory bowel diseases. The neurodegenerative disease can be selected from the group consisting of Multiple Sclerosis, Alzheimer's disease, and Parkinson's disease. In some embodiments, Parkinson disease includes idiopathic Parkinson and atypical Parkinsonism. The proliferative disease can be selected from the group consisting of lung cancer, colon cancer, head and neck cancer, ovarian cancer, bladder cancer, prostate cancer, kidney cancer, and gastric cancer. The inflammatory bowel disease is selected from the group consisting of Crohn's disease, ulcerative colitis and irritable bowel syndrome. The respiratory disease can include pulmonary artery hypertension. The renal disease can include chronic kidney disease.

In some embodiments, the sensors have dual sensing sensitivities, such as a dual analyte and pressure sensor. One of skill in the art readily understands that a signal generated by each parameter (analyte adsorption or pressure) is extracted using pre-measurement calibration, post-measurement calculation or a combination thereof.

In some embodiments, the platform unit comprises a plurality of sensors. In certain such embodiments, arrangement of the sensors can be performed as is known in the art. Non-limiting arrangement includes a matrix of sensors (rows and columns) comprising a plurality of sensors, for example between 2 and 20 sensors, wherein each sensor independently generates an electrical signal in response to pressure and/or analyte sensing. Each sensor can comprise different or similar metal nanoparticles capped with a different or similar organic coating. Additionally, each sensor can have similar or different sensing properties. For example, some sensors can be configured to detect pressure and other sensors can be configured to detect analyte molecules.

In further embodiments, the self-healing sensor is configured to detect humidity and/or temperature in addition to the pressure and analyte sensing.

Sensor Signal Measurement and Analyzing Devices

The sensor signal can be detected by a suitable detection device. Thus, in some embodiments, the self-healable platform unit or its sensor is coupled to the signal detection and/or measuring device. Suitable detection and/or measuring devices should be susceptible to a change in any one or more of resistance, conductance, alternating current (AC), frequency, capacitance, impedance, inductance, mobility, electrical potential, optical property and voltage threshold. Each possibility represents a separate embodiment of the present invention. In additional embodiments, the measuring devices are susceptible to swelling or aggregation of capped nanoparticles as well as to a change in any one or more of optical signal (detected by e.g. spectroscopic ellipsometry), fluorescence, chemiluminsence, phosphorescence, bending, surface acoustic wave, piezoelectricity and the like. Each possibility represents a separate embodiment of the present invention. Changes in the electric properties of the sensor, such as resistance, conductance, alternating current, capacitance, impedance, electrical potential, or voltage threshold can be measured by any suitable device known in the art, including, inter alia, a data logger, a potentiostat, a voltmeter, a conductivity meter, an LCR meter or a millimeter. Changes in the optical properties of the sensor, including fluorescence, chemiluminsence, or phosphorescence, can be measured by any suitable technique and/or device, such as but not limited to, spectroscopic ellipsometry, fluorescence spectroscopy or a luminometer. Changes in the piezoelectricity properties of the sensor set can be measured using, for example, a piezoelectric sensor. The measured signals can be displayed on a display or transmitted to a host computer.

When sensors having dual sensing sensitivities or a plurality of sensors are used, the signals obtained from the sensors can be analyzed by a computing system configured for executing various algorithms stored on a non-transitory memory. Thus, according to some embodiments, the self-healing platform unit is coupled to said computing system. The algorithms can include learning and pattern recognition algorithms, such as, but not limited to, artificial neural network (ANN) algorithm, support vector machine (SVM), discriminant function analysis (DFA), principal component analysis (PCA), multi-layer perception (MLP), generalized regression neural network (GRNN), fuzzy inference system (FIS), self-organizing map (SOM), radial bias function (RBF), genetic algorithm (GAS), neuro-fuzzy system (NFS), adaptive resonance theory (ART), partial least squares (PLS), multiple linear regression (MLR), principal component regression (PCR), linear discriminant analysis (LDA), cluster analysis, nearest neighbor, Fisher linear discriminant analysis (FLDA), soft independent modeling of class analogy (SIMCA), K-nearest neighbors (KNN), genetic algorithms, and fuzzy logic algorithms and canonical discriminant analysis (CDA).

Self-Healing Platform Unit Fabrication Procedure

According to the principles of the present invention, the self-healing platform unit is fabricated by a bottom-up process, including preparing the self-healing substrate; preparing a self-healing electrically conductive paste; applying said self-healing electrically conductive paste to the substrate to obtain the at least one self-healing electrode; and depositing the at least one sensor on the substrate, wherein the at least one sensor is in electric contact with the at least one self-healing electrode.

According to some embodiments, the step of preparing the self-healing substrate is a one-step process. In further embodiments, said one-step process involves mixing polymer precursors comprising polymeric chains, comprising diisocyanate terminated polyether and amine-terminated crosslinking bridge molecules. In further embodiments, the crosslinking bridge molecules contain aromatic disulfide moieties. In still further embodiments, the polyether is a polypropylene. In yet further embodiments, the diisocyanate terminated polyether comprises aromatic isocyanate end groups. A non-limiting example of such aromatic diisocyanate end group includes tolylene diisocyanate. According to particular embodiments, the step of preparing the self-healing substrate comprises mixing 4-aminophenyl disulfide with poly(propylene glycol), tolylene 2,4-diisocyanate terminated.

The mixing of the polymer precursors is performed in a suitable solvent. The non-limiting examples of suitable solvents include tetrahydrofuran (THF), isopropanol, n-propanol, methanol, chloroform and combinations thereof.

According to certain embodiments, the step of preparing the self-healing substrate comprises degassing the mixture of the polymer precursors under vacuum for at least about 10 minutes, preferably 15 minutes. According to some embodiments, the step of preparing the self-healing substrate comprises curing of the obtained mixture for at least about 36 hours at the temperature of about 75° C. to about 85° C. In some exemplary embodiments, the curing time is 48 hours and the curing temperature is 75° C.

According to the principles of the present invention, the step of preparing the self-healing conductive paste comprises dispersing metal microparticles in a polyurethane diol solution and degassing under vacuum for at least about 15 minutes. In order to achieve uniform dispersion, the metal microparticles should be dispersed with a high-performance homogenizer or mixer.

According to some embodiments, the step of applying the self-healing electrically conductive paste to the substrate comprises applying a mask to the substrate and coating the substrate with the conductive paste. The mask can be made of any non-adhesive material. In some exemplary embodiments, the mask is a polydimethylsiloxane (PDMS) film or a paper film. The coating can be performed by a technique selected from the group consisting of doctor-blade, drop-casting, inject printing, and transfer molding. Each possibility represents a separate embodiment of the invention. In some exemplary embodiments, the coating is performed by a doctor-blade technique.

Sensors comprising metallic nanoparticles capped with an organic coating can be synthesized as is known in the art, for example using the two-phase method (Brust et al., J. Chem. Soc. Chem. Commun., 1994, 7, 801) with some modifications (Hostetler et al., Langmuir 1998, 14, 17). In a non-limiting example, $AuCl_4^-$ is transferred from aqueous $HAuCl_4.xH_2O$ solution to a toluene solution by the phase-transfer reagent TOAB. After isolating the organic phase, excess thiols are added to the solution. The mole ratio of thiol: $HAuCl_4 \times H_2O$ can vary between 1:1 and 10:1, depending on the thiol used. This is performed in order to prepare mono-disperse solution of gold nanoparticles in an average size of about 3-6 nm. Exemplary procedures include, but are not limited to thiol:Au mole ratios of 10:1 and 1:1 for dodecanethiol and butanethiol-capped gold nanoparticles, respectively at an average size of about 5 nm. After vigorous stirring of the solution, aqueous solution of the reducing agent $NaBH_4$ in large excess is added. The reaction is constantly stirred at room temperature for at least 3 hours to produce a dark brown solution of the thiol-capped Au nanoparticles. The resulting solution is further subjected to solvent removal in a rotary evaporator followed by multiple washings using ethanol and toluene. Gold nanoparticles capped with e.g. 3-ethoxythiophenol can be synthesized by the ligand-exchange method from pre-prepared hexanethiol-capped gold nanoparticles. In a typical reaction, excess of thiol, 3-ethoxythiophenol, is added to a solution of hexanethiol-capped gold nanoparticles in toluene. The solution is kept under constant stirring for a few days in order to allow as much ligand conversion as possible. The nanoparticles are purified from free-thiol ligands by repeated extractions.

Sensors comprising a plurality of metallic nanoparticles capped with an organic coating can be formed on the self-healing substrate using a variety of techniques well known in the art. Exemplary techniques include, but are not limited to, (i) Random deposition from solution by drop casting, spin coating, spray coating and other similar techniques. Each possibility represents a separate embodiment of the present invention.

(ii) Field-enhanced or molecular-interaction-induced deposition from solution. Each possibility represents a separate embodiment of the present invention.

(iii) Langmuir-Blodgett or Langmuir-Schaefer techniques. Each possibility represents a separate embodiment of the present invention.

(iv) Soft lithographic techniques, such as micro-contact printing (mCP), replica molding, micro-molding in capillaries (MIMIC), and micro-transfer molding (mTM). Each possibility represents a separate embodiment of the present invention.

(v) Various combinations of Langmuir-Blodgett or Langmuir-Schaefer methods with soft lithographic techniques. Each possibility represents a separate embodiment of the present invention.

(vi) Printing on solid-state or flexible substrates using an inject printer designated for printed electronics.

According to some embodiments, the step of depositing the at least one sensor comprises applying a solution comprising the metal nanoparticles capped with an organic coating to the substrate, wherein the concentration of said metal nanoparticles in the solution is at least about 30 mg/mL. In further embodiments, the concentration of the metal nanoparticles is at least about 40 mg/mL. In some exemplary embodiments, the concentration is at least about 50 mg/mL. In further exemplary embodiments, the sensor is deposited on the substrate by drop-casting from solution of the metal nanoparticles capped with an organic coating.

Self-Healing Platform Unit Features and Uses

The platform unit according to the principles of the present invention is configured to self-heal following mechanical damage of each of its components, including the substrate, the electrode and the sensor.

According to some embodiments, the self-healing platform unit is configured to self-heal following mechanical damage of at least one of the substrate, the electrode or the sensor within less than about 24 hours at room temperature. In further embodiments, the self-healing substrate is configured to physically recombine following mechanical damage within less than about 20 hours at room temperature. In yet further embodiments, the self-healing substrate is configured to physically recombine following mechanical damage within less than about 16 hours at room temperature, less than about 10 hours, less than about 5 hours, or less than about 1 hour. Each possibility represents a separate embodiment of the invention. In still further embodiments, the self-healing electrode is configured to physically recombine following mechanical damage within less than about 2 hours at room temperature. In still further embodiments, the self-healing electrode is configured to physically recombine following mechanical damage within less than about 1 hour at room temperature, less than about 30 minutes or less than about 15 minutes. Each possibility represents a separate embodiment of the invention. In yet further embodiments, the sensor is configured to physically recombine following mechanical damage within less than about 20 hours at room temperature. In still further embodiments, the sensor is configured to physically recombine following mechanical damage within less than about 16 hours at room temperature, less than about 10 hours, less than about 5 hours, or less than about an hour. Each possibility represents a separate embodiment of the invention. In certain embodiments, the mechanical damage comprises a partial cut of the substrate, electrode or the sensor. In other embodiments, the mechanical damage comprises a full cut of the substrate, electrode or the sensor.

In additional embodiments, the self-healing electrode is configured to regain at least about 50% of the conductivity thereof following mechanical damage within less than about 30 minutes. In further embodiments, the self-healing electrode is configured to regain at least about 50% of the conductivity thereof within less than about 20 minutes, less than about 10 minutes or less than about 5 minutes. Each possibility represents a separate embodiment of the invention. In further embodiments, the sensor is configured to regain at least about 50% of the conductivity thereof following mechanical damage within less than about 2 hours. In further embodiments, the sensor is configured to regain at least about 50% of the conductivity thereof within less than about 1 hour, less than about 30 minutes or less than about 20 minutes. Each possibility represents a separate embodiment of the invention. In certain embodiments, the mechanical damage comprises a partial cut of the substrate, electrode or the sensor. In other embodiments, the mechanical damage comprises a full cut of the substrate, electrode or the sensor.

According to some embodiments, the self-healing platform unit is configured to self-heal following mechanical damage of at least one of the substrate, the electrode or the sensor at a temperature range of from about −20° C. to about 40° C. In certain embodiments, the self-healing substrate is configured to physically recombine following mechanical damage at the temperature range of from about −20° C. to about 40° C.

According to some embodiments, the self-healing platform unit is configured to self-heal following mechanical damage of at least one of the substrate, the electrode or the sensor following more than 2 cycles of mechanical damage and healing of the platform unit. According to further embodiments, the self-healing platform unit is configured to self-heal following mechanical damage of at least one of the substrate, the electrode or the sensor following more than 3 cycles of mechanical damage and healing of the platform unit.

According to further embodiments, the self-healing electrode is configured to regain at least about 50% of the conductivity thereof following at least about 5 cycles of mechanical damage and healing thereof. In yet further embodiments, the self-healing electrode regains at least about 50% conductivity following at least about 10 cycles, at least about 15 cycles or even at least about 15 cycles. Each possibility represents a separate embodiment of the invention. According to additional embodiments, the sensor is configured to regain at least about 50% of the conductivity thereof following at least about 3 cycles of mechanical damage and healing thereof, or even at least about 5 cycles. In certain embodiments, the cycles of mechanical damage and healing include mechanical damage applied to the same portion of the electrode or sensor during each cycle. In certain embodiments, the mechanical damage comprises a partial cut of the substrate, electrode or the sensor. In other embodiments, the mechanical damage comprises a full cut of the substrate, electrode or the sensor.

According to the principles of the present invention, the self-healing platform unit is configured to detect pressure and/or analyte molecules. According to some embodiments, the load detection range of the platform unit ranges from about 0.05 to about 0.15 $(gF)^{-1}$. In certain such embodiments, the self-healing substrate has a thickness of about 1 mm. In further embodiments, the strain detection range of the platform unit ranges from about 10 $mm^{-1}$ to about 30 $mm^{-1}$. In additional embodiments, the sensitivity of the platform unit towards volatile organic compounds is in the range of about 20 to about 2000 $ppb^{-1}$, depending on the VOC and the capping organic ligand.

In additional embodiments, the self-healable platform unit is configured to retain at least about 50% of the pressure sensing sensitivity thereof following mechanical damage. In further embodiments, the self-healable platform unit is configured to retain at least about 70% of the pressure sensing sensitivity thereof, about 85%, about 90%, about 95% or about 99% of the pressure sensing sensitivity. Each possibility represents a separate embodiment of the invention. In certain embodiments, the pressure sensing sensitivity includes load sensitivity or stretching sensitivity. In yet further embodiments, the self-healable platform unit is configured to retain at least about 50% of the analyte sensing sensitivity thereof following mechanical damage. In further embodiments, the self-healable platform unit is configured to retain at least about 70% of the analyte sensing sensitivity thereof or about 85% of the analyte sensing sensitivity. In certain embodiments, the mechanical damage comprises a full cut of the substrate, electrode or the sensor.

The self-healing platform unit of the present invention may be used in applications which require the production of large-scale sensor arrays that can sense load and analyte molecules with high resolution and short response times and which do not allow convenient or frequent replacement of the sensors. The non-limiting examples of such applications include space technology and artificial and/or electronic skin. The self-healing platform unit can also be used in combination with non-healing e-skin, for sensing harmful or toxic surface of object which can damage the non-healable sensors. Artificial and/or electronic skin may be integrated in medical prosthesis and robotics industries.

The self-healing platform unit according to the principles of the present invention can further be used in flexible panels, not only as a touch sensor but also as a scratch-protective layer.

As used herein and in the appended claims the singular forms "a", "an," and "the" include plural references unless the content clearly dictates otherwise. Thus, for example, reference to "an organic coating" includes a plurality of such organic coatings and equivalents thereof known to those skilled in the art, and so forth. It should be noted that the term "and" or the term "or" is generally employed in its sense including "and/or" unless the content clearly dictates otherwise.

As used herein, the term "about", when referring to a measurable value such as an amount, a temporal duration, and the like, is meant to encompass variations of +/−10%, more preferably +/−5%, even more preferably +/−1%, and still more preferably +/−0.1% from the specified value, as such variations are appropriate to perform the disclosed methods.

The following examples are presented in order to more fully illustrate some embodiments of the invention. They should, in no way be construed, however, as limiting the broad scope of the invention. One skilled in the art can readily devise many variations and modifications of the principles disclosed herein without departing from the scope of the invention.

EXAMPLES

Characterization Methods
Characterization of Self-Healing Materials

Surface characterization of self-healing materials of the platform unit was conducted by an optical microscope (BX51M, Olympus) integrated with a camera (LC20, Olympus) in order to study healing process. Images were captured by LCmicro 5.1 software. Electrical characterization of the self-healing electrode was performed by Multimeter 34411A (Agilent).

Bending and Stretching Experiments A MARK 10 ESM301 motorized test stand was used to apply strain at a constant speed of 0.05 mm/s. For bending experiments, the stress was applied by an upper beam (downward) and supported by bottom beams (stationary). Under applied stress/pressure/force, the substrate was bent. The outer (upper) surface was then subjected to compression, while the inner (lower) surface was under dilation. In the stretching setup, the strain/force was applied between two metal grips on a dog bone sample. A MARK 10 ESM301 motorized test stand was used to apply strain at a constant speed of 0.05 mm/s between metal grips that were attached to the wider part of the sample, while most of the strain occurs in the thinner part of the sample. The forces were measured by an Advanced Digital FORCE GAUGE, made by Mark10 USA. In these experiments, the electrical resistance was measured by a Keithley data-logger device (model 2701 DMM) controlled by a custom Labview program.

VOCs Exposure

A Keithley data logger device (model 2701 DMM) controlled by a custom Labview program was used to sequentially acquire resistance readings from the sensor array and voltage readings from the environmental sensors. A typical exposure cycle involved a 24 min vacuum (<100 mtorr) baseline step, followed by 5 s exposure and 15 min measurement to the test vapor under stagnant conditions, and ended with another 24 min vacuum step [Konvalina, G.; Haick, H., ACS Appl. Mater. Interfaces 2013, 4, 317-325]. Nitrogen and VOC (Scheme 3) flow with a 5 L/min constant flowrate are alternately introduced into the chamber. Four successively increasing concentrations of each VOC, controlled gas concentrations (0.2-170 ppm) were produced by a commercial dynamic liquid injection dilution (DLID) system (Umwelttechnik MCZ, Germany) [Wang, B.; Cancilla, J. C.; Torrecilla, J. S.; Haick, H., Nano Lett. 2014, 14, 933-938].

Example 1—Synthesis of the Components of the Self-Healing Platform Unit Synthesis of the Self-Healing Substrate A one-step procedure was developed for the preparation of a self-healing polymer. 4-Aminophenyl disulfide (750 mg, 3.0 mmole) was dissolved in 1 mL of tetrahydrofuran (THF) in a 100-mL beaker under ultrasonic condition. Then, poly(propylene glycol), tolylene 2,4-diisocyanate terminated, $M_w$=2300 (5.1 g, 2.2 mmole) was added and successively stirred for 15 min. Then, the obtained viscous mixture was transferred to a Teflon mold and degassed under vacuum for 15 min in order to completely remove the bubbles. Finally, the degassed viscous liquid was cured for 48 h at 75° C. The obtained product was a yellowish transparent elastomer, having a glass transition temperature of −55° C., which is termed hereinbelow "sh-crl-PU".

Figure 1B:
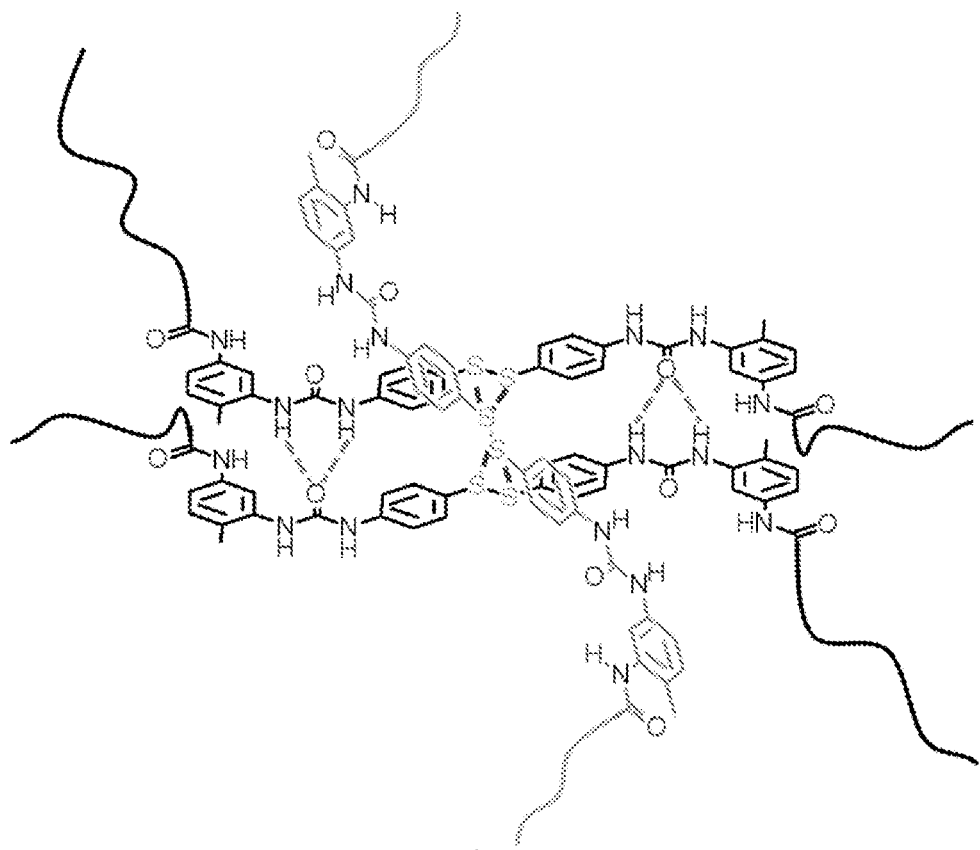
FIG. 1B: Schematic representation of the self-healing polymer substrate structure and crosslinking.

The sh-crl-PU chemical structure and crosslinking mechanism is schematically depicted in FIG. 1B. The cross-linking of the polymeric chains of the self-healing polymer can proceed through dynamic covalent aromatic disulfide bonds. The self-healing polymer can further include less stable hydrogen bonds between urea units. Both aromatic disulfide bonds and hydrogen bonds are highly dynamic, enabling self-healing properties of the synthesized polymer.

Synthesis of the Self-Healing Electrically Conductive Polymeric Paste.

1 g of silver µAg (5-8 µm, ≥99.9% trace metals basis) powder was dispersed in 220 µL, of polyurethane diol solution ($M_w$=320) for 15 min using homogenizer. The lower molecular weight and non-crosslinked PU was used in order to easily disperse µAg. Next, the dark grey viscous µAg-PU composite was degassed under vacuum for 15 min. The obtained product was a highly conductive (about 20 to 30Ω) paste, which is termed hereinbelow "sh-µAg-PU". The optimized volume ratio between the metal microparticles and the non-crosslinked polymer was 3:7. It was found that substantially lower ratio, namely lower amount of metal microparticles per non-crosslinked polymer, led to insufficient conductivity, whereas a substantially higher ratio led to reduced self-healing properties.

Synthesis of MCNPs:

For VOC sensing, AuNPs was proven as a superior material because of its high sensitivity to VOCs as well as tunability for use in flexible sensor [Segev-Bar et al., ACS Appl. Mater. Interfaces 2013, 5, 5531-5541]. The capping ligands for the preparation of the self-healing platform unit were chosen to be 3-ethoxythiophenol, hexanethiol, decanethiol and tert-dodecanethiol. Spherical gold nanoparticles (AuNPs; 3-6 nm in diameter) were synthesized as described in Peng et al., Nature Nanotech. 2009, 4, 669-673; and Dovgolevsky et al., J. Phys. Chem. C. 2010, 114, 14042-14049; the content of each of which is hereby incorporated in its entirety. Briefly, a solution of $HAuCl_4$ was added to a stirred solution of TOAB in toluene. After 10 min stirring, the lower aqueous phase was removed. Organic ligands and sodium borohydride were subsequently added to the toluene phase. After 3 hours at ice temperature, the lower aqueous phase was removed and the toluene phase was subsequently evaporated by rotary evaporation. After first washing with cold ethanol, the solution was kept at 5° C. for 18 hours until complete immersion was achieved. The dark brown precipitate was filtered off and washed with ethanol.

Fabrication of the Platform Unit

For fabrication of the platform unit, a 20×20×1-mm sh-crl-PU was prepared as a substrate, as described hereinabove. Then, a 50-µm non-adhesive paper mask was placed onto sh-crl-PU substrate. Next, sh-µAg-PU was coated on the substrate using doctor-blade method [Ito, S.; Kitamura, T.; Wada, Y.; Yanagida, S., Sol. Energy Mater. Sol. Cells 2003, 76, 3-13]. After removal of the mask, the distance between two sh-µAg-PU electrodes is 0.5 mm. Two electrical wires were penetrated on the back of the sh-crl-PU substrate to connect with the sh-µAg-PU electrodes. This structure was vacuumed for 30 min before drop-casting 1.0-µL, solution of AuNPs onto the groove between two sh-µAg-PU electrodes. Finally, the platform unit (also termed hereinbelow "sh-chemiresistor") was stored in vacuum for 1 day before using.

Figure 2A:
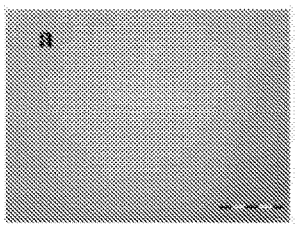
FIGS. 2A-2L: Images of the components of the self-healing platform unit as prepared and following mechanical damage—as-prepared substrate (FIG. 2A), cut substrate (FIG. 2B), substrate 30 min after cutting (FIG. 2C), substrate 16 hours after cutting (FIG. 2D), as-prepared electrode (FIG. 2E), cut electrode (FIG. 2F), electrode 30 min after cutting (FIG. 2G), electrode 16 hours after cutting (FIG. 2H), as-prepared sensor (FIG. 2I), cut sensor (FIG. 2J), sensor 30 min after cutting (FIG. 2K), and sensor 16 hours after cutting (FIG. 2L).
Figure 2B:
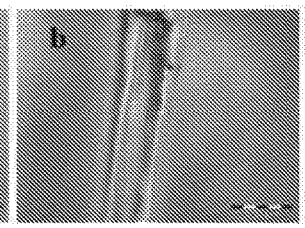
Figure 2C:
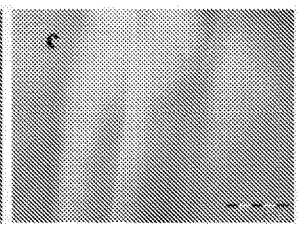
Figure 2D:
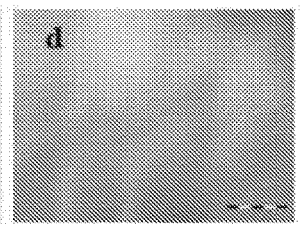
Figure 2E:
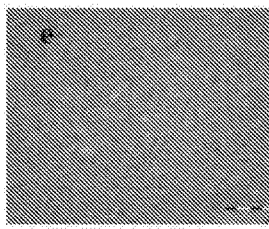

Example 2—Characterization of the Components of the Self-Healing Platform Unit Characterization of the Self-Healing Substrate Cured sh-crl-PU polymer behaves as flexible elastomer. Importantly, different from normal elastomer, this synthetic PU owns self-healing nature under damage (e.g. cutting or scratching). FIGS. 2A-2D show the self-healing process of the sh-crl-PU polymer (FIG. 2A) after making ~150 µm cut (FIG. 2B). The cutting groove was automatically healed after 30 min (FIG. 2C) and completely back to normal after 16 h under room temperature (FIG. 2D). The mechanism for the above healing process was explained by the reformation of hydrogen and disulfide metathesis bonds among PU chains after damage [Rekondo et al., Mater. Horiz. 2014, 1, 237-240].

Surprisingly, the self-healing process appeared even in temperatures as low as −20° C. Without wishing to be bound by any theory or mechanism, the ability of the system to self-heal is probably due to a low glass transition temperature of the dynamically crosslinked polymer. This property may be especially preferable for application in harsh conditions, e.g., countries with severe winters, without having a negative effect on similar application in warm climate.

The self-healing substrate was able to self-heal in the temperature range of −20° C. to 40° C.

Characterization of the Self-Healing Electrode.

Figure 2F:
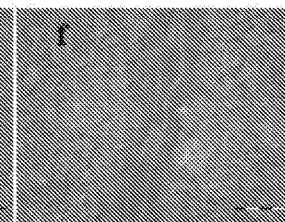
Figure 2G:
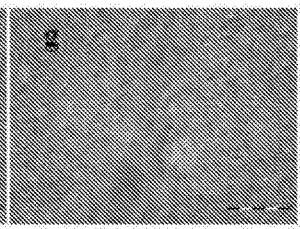
Figure 2H:
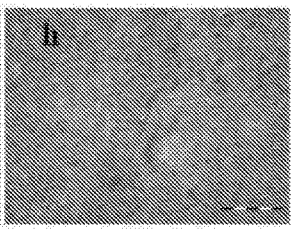
Figure 2I:
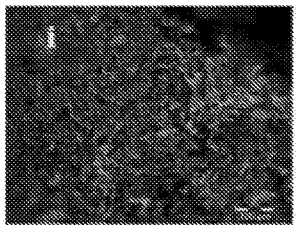
Figure 2J:
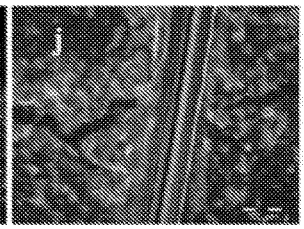
Figure 2K:
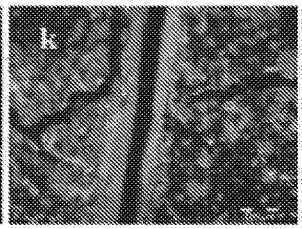
Figure 2L:

FIGS. 2E-2H show the self-healing process of the sh-µAg-PU electrode (FIG. 2E) after making ~150 µm cut (FIG. 2F). The cutting groove was quickly healed after 5 min (FIG. 2G) and completely back to normal after 30 min (FIG. 2H). Compared to the sh-crl-PU substrate, healing process of the sh-µAg-PU electrode happened much faster due to the low molecular weight and since the non-crosslinked PU is highly dynamic to heal the cut. Fast healing is beneficial for getting the platform unit back to work as soon as possible after the mechanical damage.

Figure 3A:
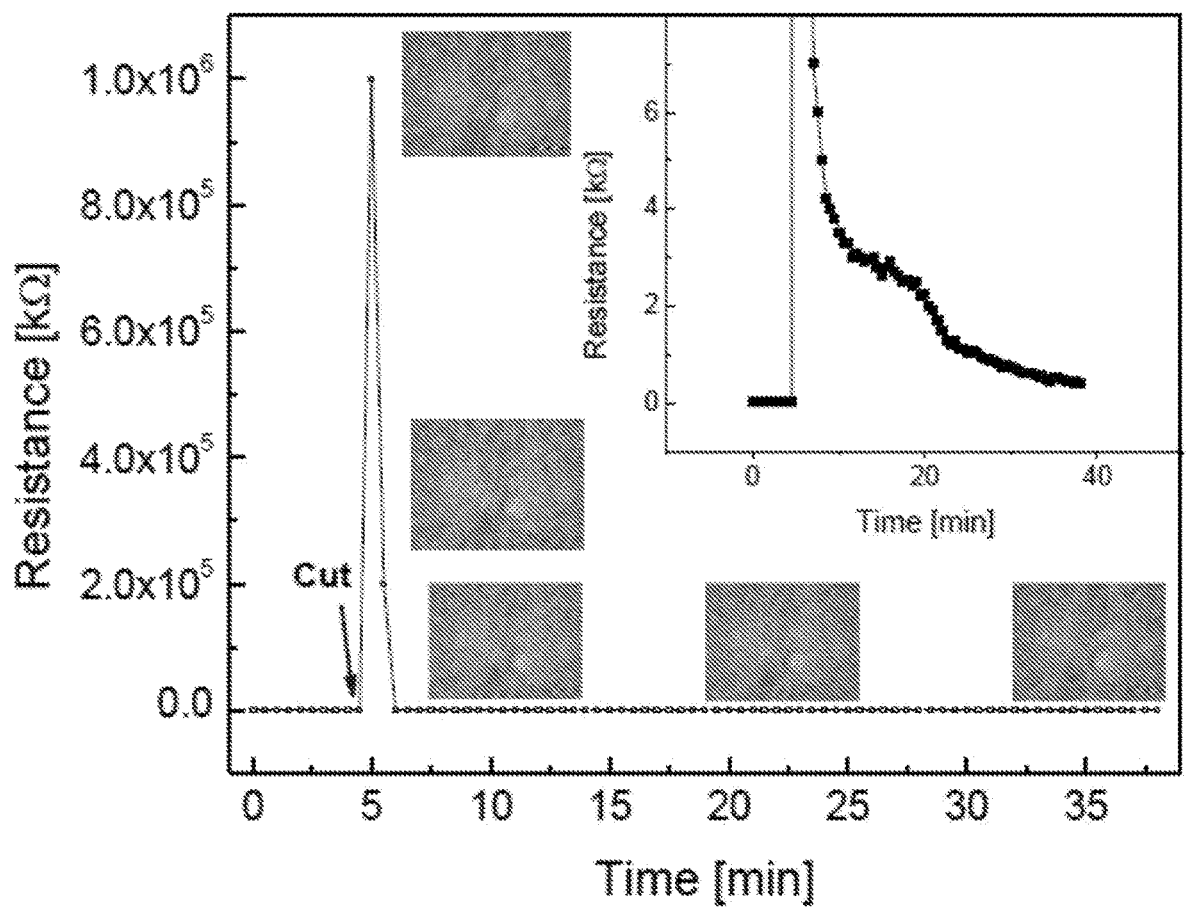
FIGS. 3A-3B: Time-dependence of resistance and healing efficiency of the self-healing silver electrode (FIG. 3A). Magnification of the resistance in the range of 0 to 8 k$\Omega$ (FIG. 3B).
Figure 3B:
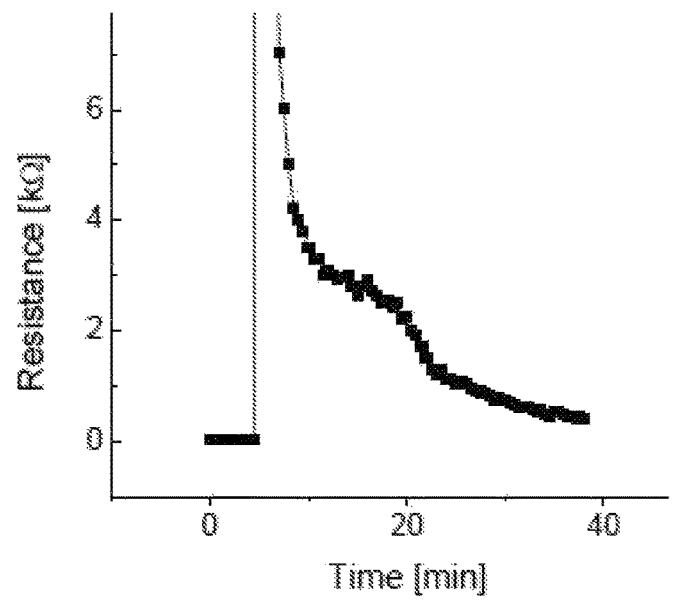

As mentioned hereinabove, the sensing device will fail if the electrode cannot regain its conductivity after damage. By simultaneously recording resistance and images of the sh-µAg-PU electrode after cutting, it was shown that the sh-µAg-PU electrode was still conductive after healing (FIGS. 3A-3B). Resistance of the sh-µAg-PU electrode decreased from 1 GΩ (value measured immediately after cutting) to 5 kΩ in about 2 min. It is to be understood that the sh-µAg-PU electrode cannot retain 100% of the conductivity thereof after healing because PU polymer is more dynamic than µAg particles, thereby moving faster to the cutting groove and causing high resistance layer [Balazs, Mater. Today 2007, 18-23]. As a result, the resistance of the self-healing electrode increased from 20Ω (initial value) up to 400Ω after healing. Nevertheless, said increase in resistance did not affect the sensor, which resistance is significantly higher and ranges from 1 to 10 MΩ.

In a comparative study, three additional electrically conductive pastes were prepared with different volume ratios between the metal microparticles and the non-crosslinked polymer and using a crosslinked polyurethane polymer instead of the non-crosslinked polyurethane polymer.

Figure 3C:
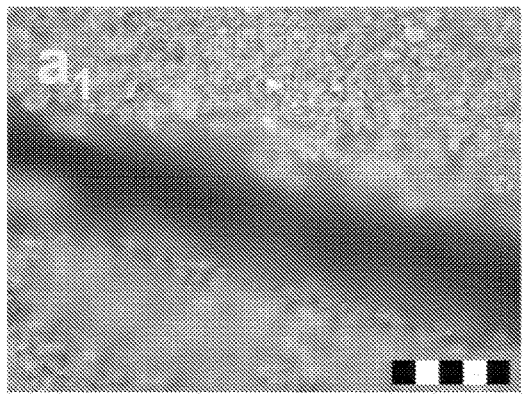
FIGS. 3C-3D: Images of the conductive paste comprising Ag microparticles dispersed in the polyurethane diol solution at the 4:6 volume ratio, immediately after the cut (FIG. 3C) and 2 h after cutting (FIG. 3D)
Figure 3D:
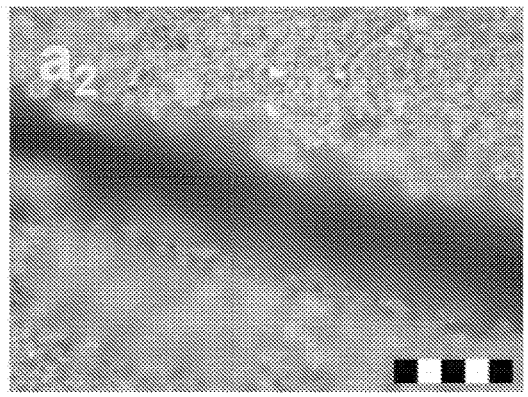
Figure 3E:
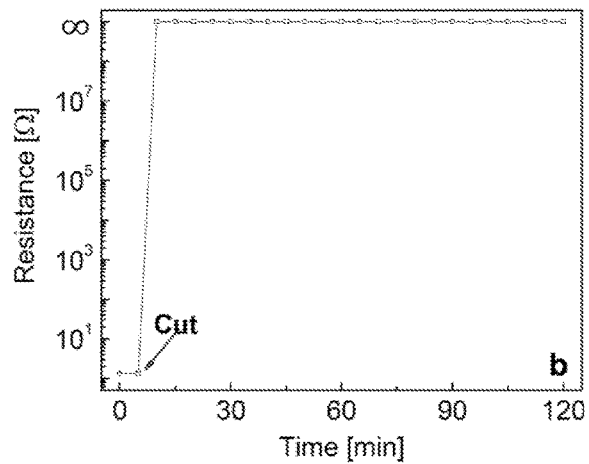
FIG. 3E: Time-dependence of resistance and healing efficiency of the conductive paste comprising Ag microparticles dispersed in the polyurethane diol solution at the 4:6 volume ratio.

At the volume ratio of 4:6 between Ag microparticles and the polyurethane diol solution, the obtained electrode was so brittle that it could not self-heal. This was demonstrated by no change in optical images of the electrode after cut (FIG. 3C) and 2 h later (FIG. 3D). Moreover, resistance of said electrode increased drastically after cutting and did not decrease to an acceptable level even following 2 hours (FIG. 3E).

Figure 3F:
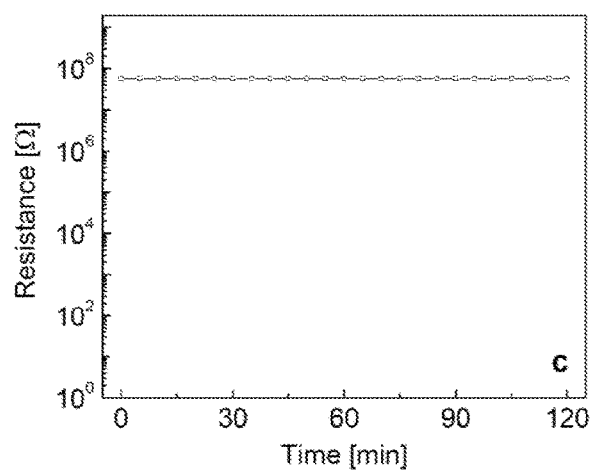
FIG. 3F: Resistance of the conductive paste comprising Ag microparticles dispersed in the polyurethane diol solution at the 0.5:9.5 volume ratio.

At the volume ratio of 0.5:9.5 between Ag microparticles and the polyurethane diol solution, the obtained electrode was not conductive, and said ratio was found to be below percolation threshold of a conductive composite (FIG. 3F).

Figure 3G:
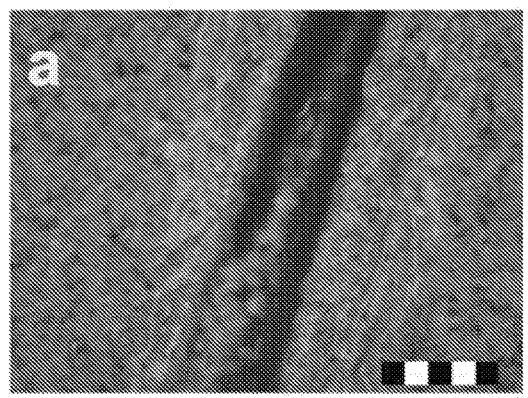
Figure 3H:
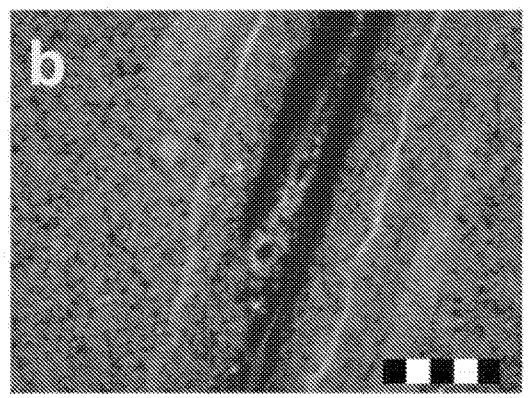

At the volume ratio of 3:7 between Ag microparticles and the crosslinked polyurethane, the obtained electrode could not self-heal after cutting (FIGS. 3G and 3H). Therefore, a composite of microparticles of Ag and sh-crl-PU could not be used as electrode of the self-healing platform unit.

Characterization of the Sensor.

For the fabrication of the AuNPs sensing layer, which is capable of self-healing, PU polymer could not be mixed with the AuNPs, since it is highly insulating. Thus, a different approach was adopted, which included drop-casting a layer of AuNPs on the sh-crl-PU substrate. Surprisingly, the self-healing sh-crl-PU substrate was able to impart the self-healing properties to the AuNPs film, bringing the AuNPs together following the mechanical damage of the sensor layer, as shown in FIGS. 2I-2L.

Example 3—Self-Healing Platform Unit for Pressure Sensing

Figure 4A:
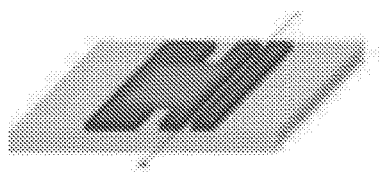
FIGS. 4A-4C: Schematic representation (FIGS. 4A-4C) and optical images at 5× magnification (FIGS. 4D-4G) of three geometric cuts made in the platform unit, including the cut in the electrode or the Y1-cut (FIGS. 4A and 4D), the cut in the electrode and the gold nanoparticles (Au NPs) sensor or the X cut (FIGS. 4B, 4E and 4F) and the cut in the Au NPs sensor or the Y2 cut (FIGS. 4C and 4G).
Figure 4B:
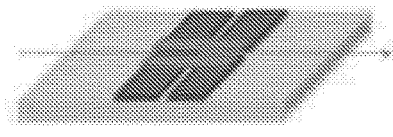
Figure 4C:
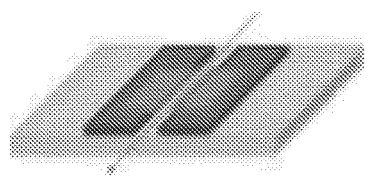
Figure 4D:
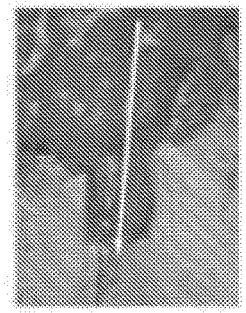
Figure 4E:
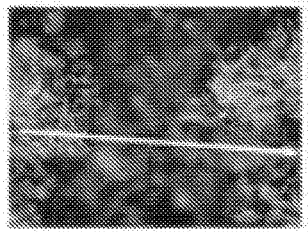
Figure 4G:
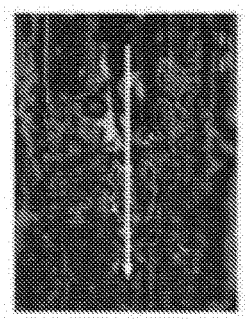
Figure 4F:
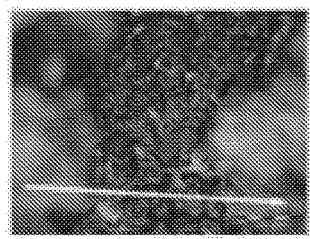

Importantly, the self-healing should be self-healable after damage, especially including cracks or cuts which completely disconnect the parts of the platform unit, thus preventing the current flow through the platform unit parts. Therefore, different geometries of cuts (FIGS. 4A-4C), were investigated, which dramatically damaged the sh-chemiresistor. Then, the performance of the sh-chemiresistor after healing was tested. The first cut (named Y1-cut) was applied to the self-healing electrode in the Y axis direction, as shown in FIG. 4A. The second cut (named X-cut) was applied to the self-healing electrode and the AuNPs layer in the X axis direction, as shown in FIG. 4B. The third cut (named Y2 cut) was applied to the AuNPs layer in the Y axis direction, as shown in FIG. 4C.

Images at all the cutting positions were recorded, demonstrating the excellent physical healing of all components of the platform unit even following three different cuts applied to the self-healing platform unit (FIGS. 4D-4G).

Figure 5A:
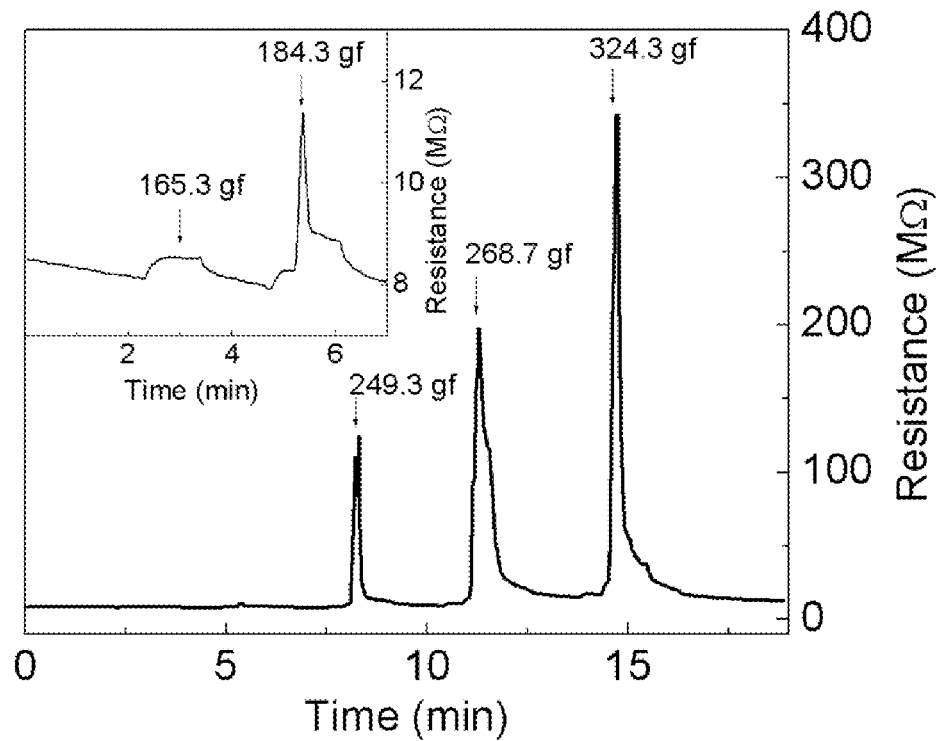
FIGS. 5A-5B: Resistance response of the sensor under applied bending (FIG. 5A) and calibration plots of relative resistance response of the sensor before the cut (■, curve 1), after the Y1 cut (●, curve 2) and after the X cut (▲, curve 3) (FIG. 5B).
Figure 5B:
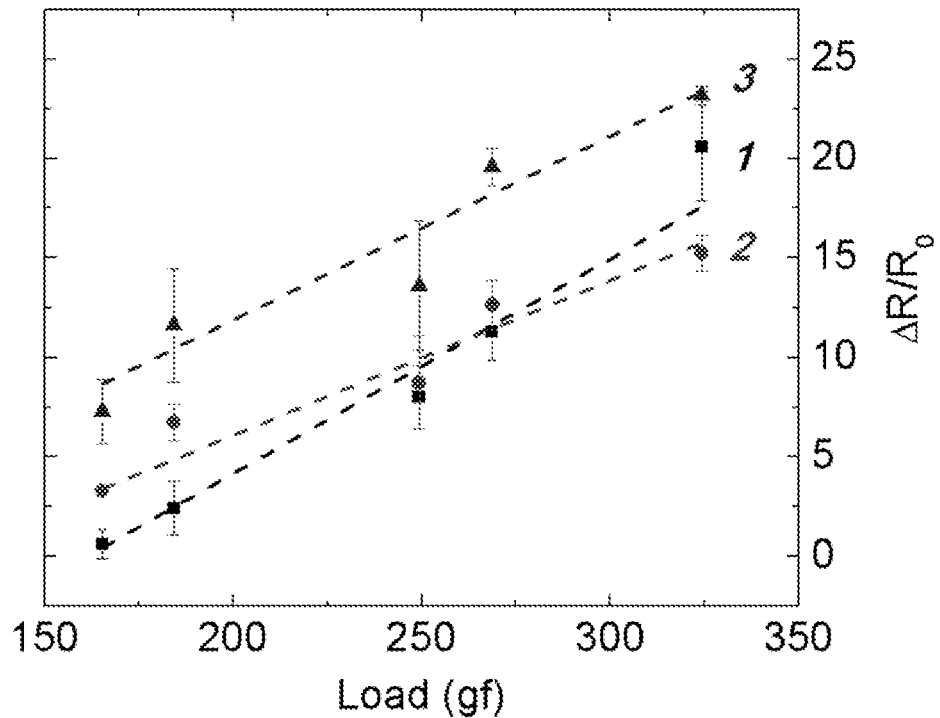
Figure 6A:
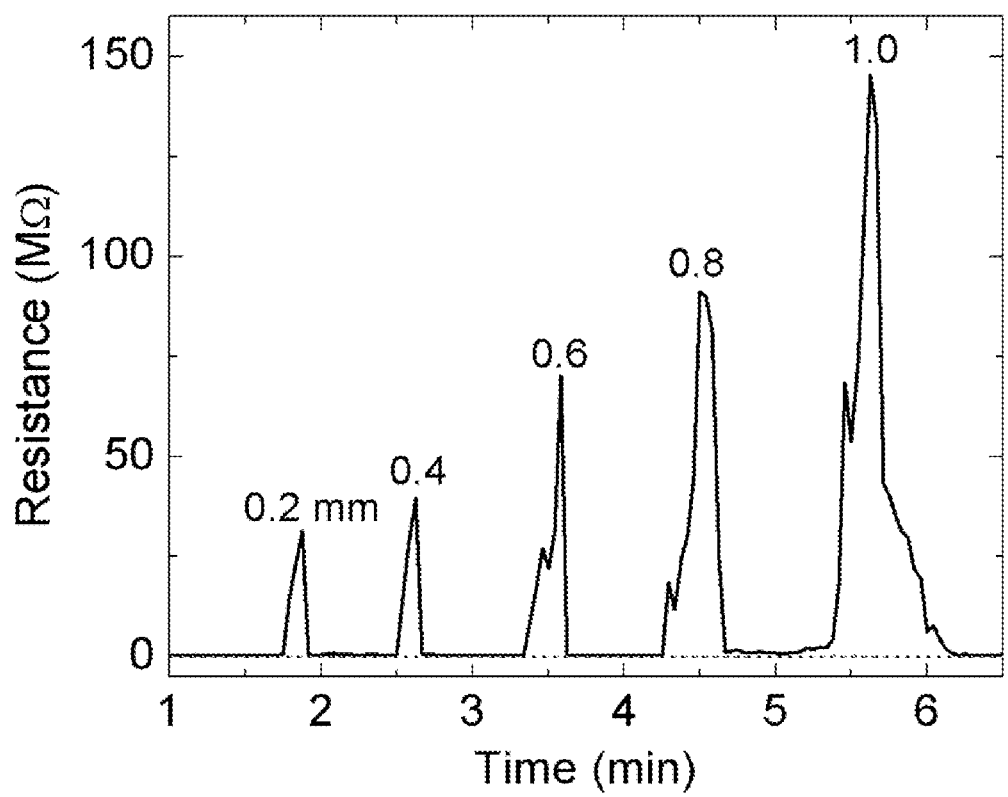
FIGS. 6A-6B: Resistance response of the sensor under applied stretching (FIG. 6A) and calibration plots of relative resistance response of the sensor before the cut (■, curve 1), after the Y1 cut (●, curve 2) and after the Y2 cut (▲, curve 3) (FIG. 6B).
Figure 6B:
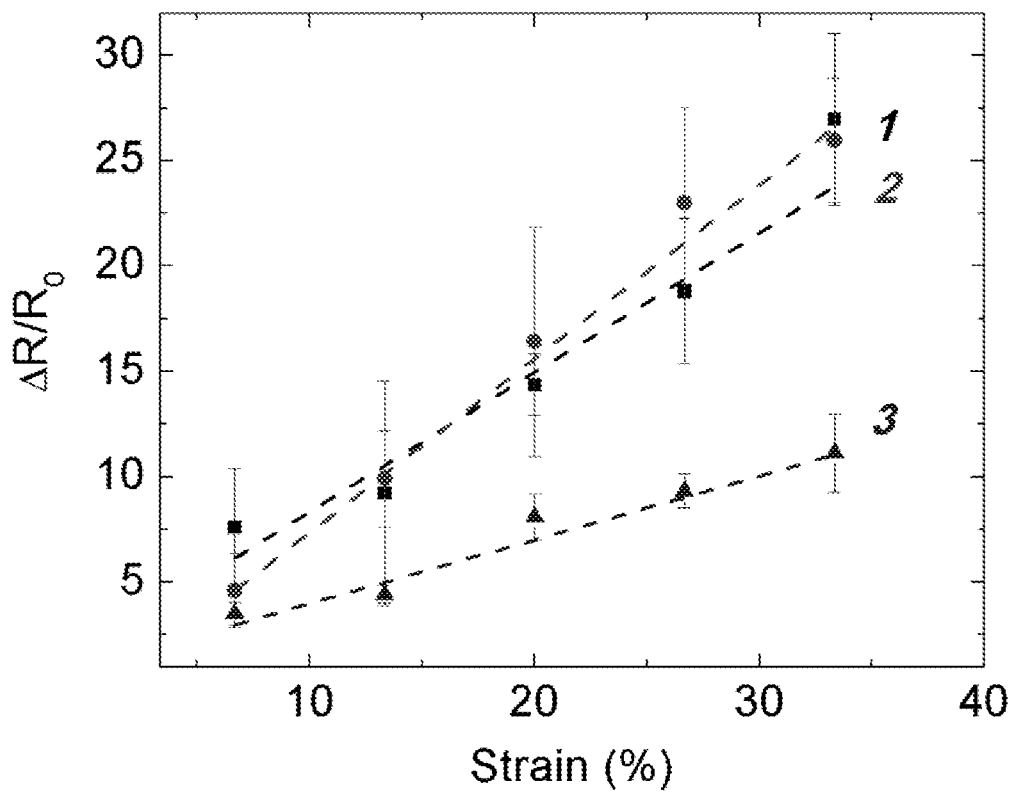

Due to flexibility of the sh-crl-PU substrate and strain sensitivity of the AuNP film, the sh-chemiresistor revealed is potential as pressure sensor. The sh-chemiresistor can operate as a strain gauge, wherein load causes deformation of the sh-chemiresistor. When load was applied to the sh-chemiresistor, the responsive signal, i.e. increase of resistance (FIG. 5A), originated from the increase of the distance between adjacent AuNPs caused by downward bending of the sh-chemiresistor. Load sensitivity of the sh-chemiresistor using 1-mm thick sh-crl-PU substrate polymer was found to be $0.108±0.010$ $(gF)^{-1}$ (curve 1, FIG. 5B). The load sensitivity was substantially unchanged following the X-cut, being $0.092±0.010$ $(gF)^{-1}$ (curve 3, FIG. 5B) and the Y1-cut, being $0.078±0.007$ $(gF)^{-1}$ (curve 2, FIG. 5C). In the stretching experiment, the responsive signal, i.e. increase of resistance (FIG. 6A), also originated from the increase of the distance between adjacent AuNPs caused by stretching of the sh-chemiresistor. Strain sensitivity of the sh-chemiresistor, specifically, of the sh-cr-PU polymer was found to be $22.04±3.31$ $mm^{-1}$ (curve 1, FIG. 6B). The strain sensitivity was substantially unchanged following the Y1-cut, being $27.46±1.18$ $mm^{-1}$ (curve 3, FIG. 6B), but was reduced following the Y2-cut to $10.07±1.63$ $mm^{-1}$ (curve 2, FIG. 6B).

Example 4—Self-Healing Platform Unit for Analyte Sensing

Figure 7:
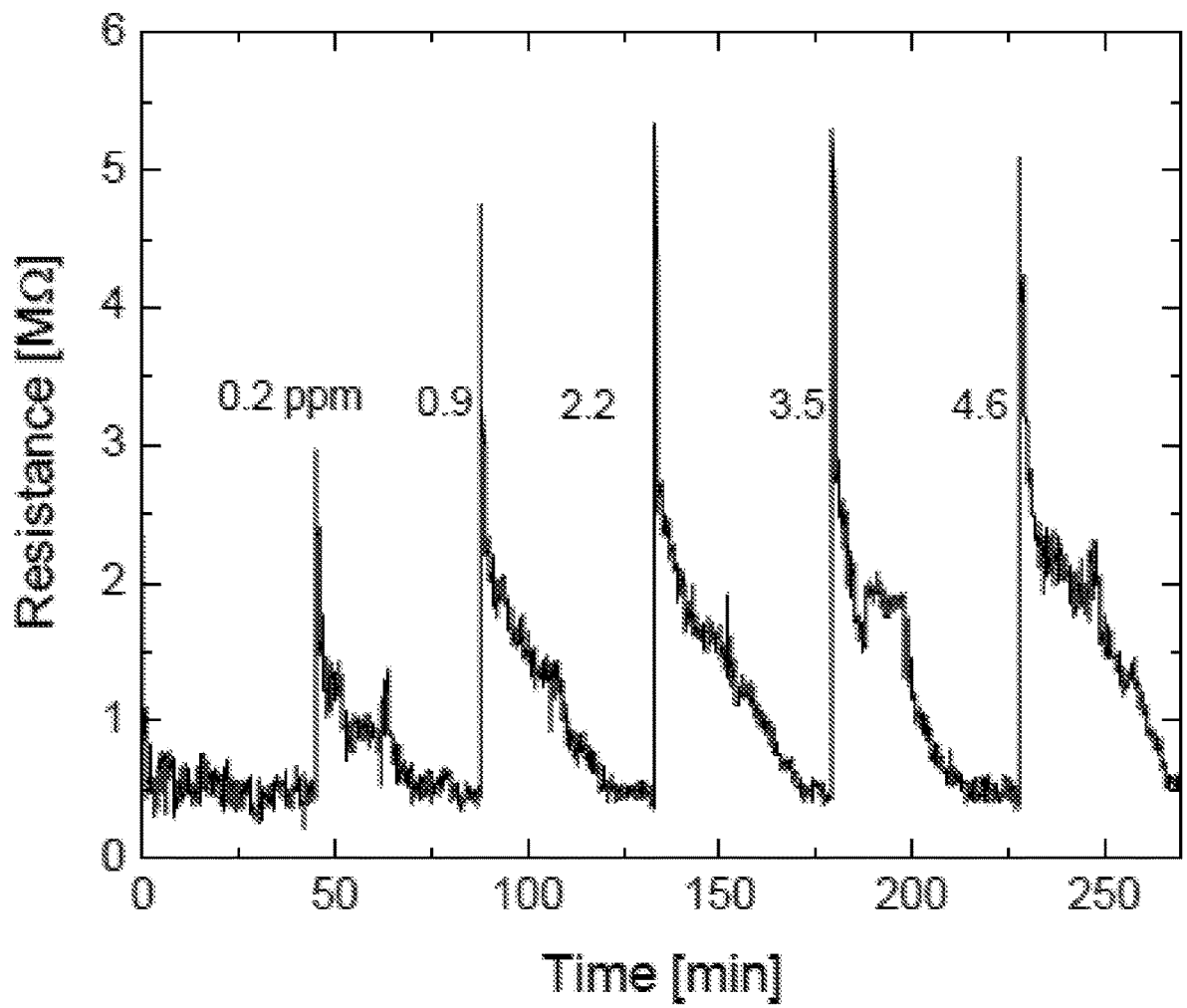
FIG. 7: Time-dependence of resistance of the sensor to the exposure of different concentrations of n-octanol
Figure 8A:
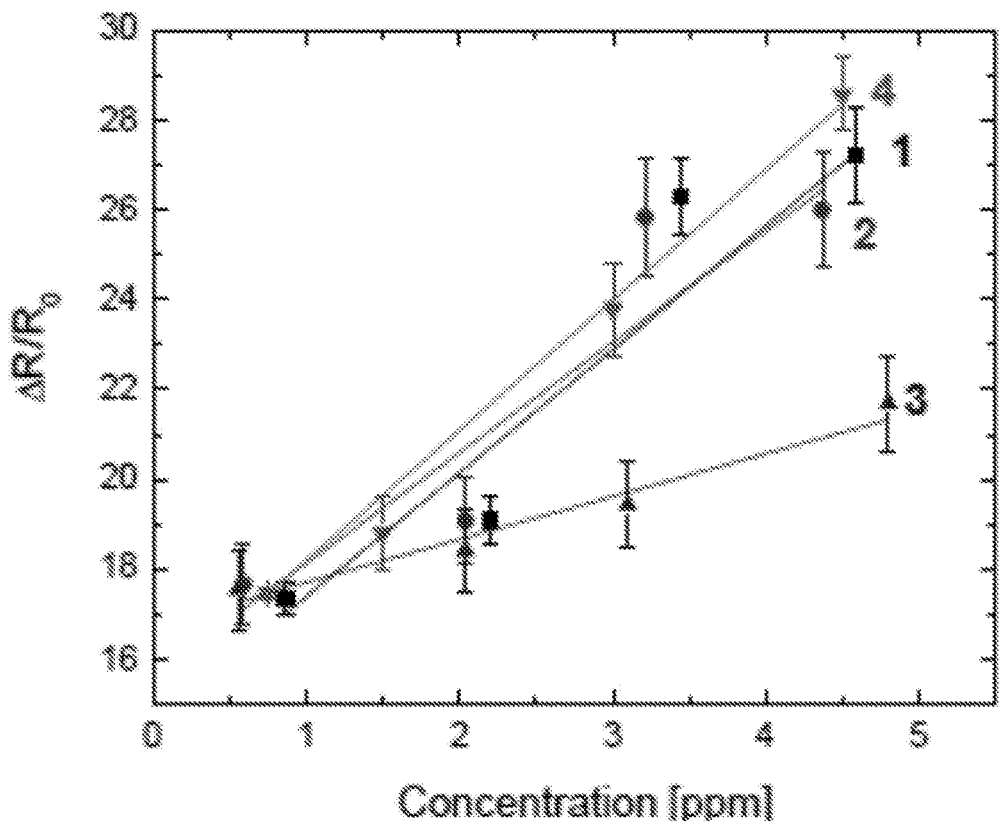
FIG. 8A: Resistance response of the sensor to the exposure of different concentrations of n-octanol for Y-cut experiments: before the first cut (■, curve 1), after the first cut (●, curve 2), after the second cut at the same position (▲, curve 3), and after a second cut at a different position (▼, curve 4).

In order to test the analyte sensing ability of the sh-chemiresistor before and after mechanical damage, the sh-chemiresistor comprising gold nanoparticles capped with 3-ethoxythiophenol was exposed to n-octanol. Resistance (mostly from AuNPs) increased with the increase of noctanol concentration (FIG. 7 and FIG. 8A, curve 1). Resistance response was reversible due to the weak binding between the AuNPs ligand and n-octanol analyte which is beneficial in practical application. Moreover, low signal/noise is also an advantage of this sh-chemiresistor. The concentration of n-octanol detected by the sh-chemiresistor was in the range of ppb which is comparable to non-healable rigid chemiresistors.

Figure 8B:
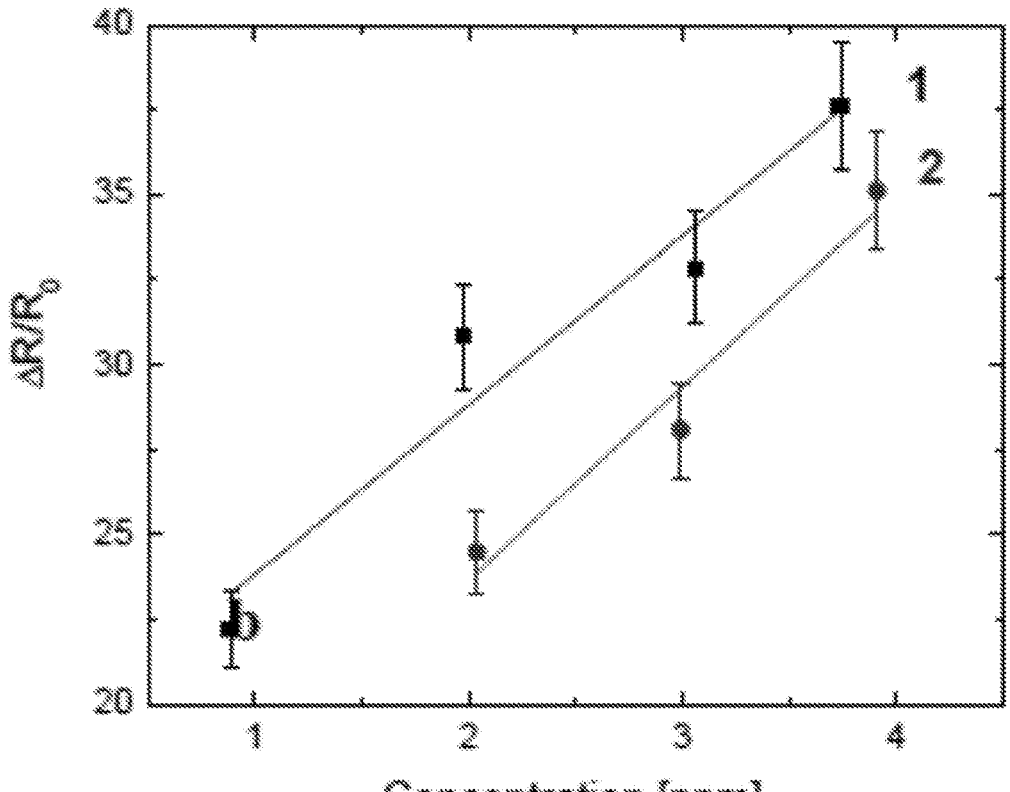
FIG. 8B: Resistance response of the sensor to the exposure of different concentrations of n-octanol for X-cut experiments: before the cut (■, curve 1) and after the cut (●, curve 2).
Figure 9A:
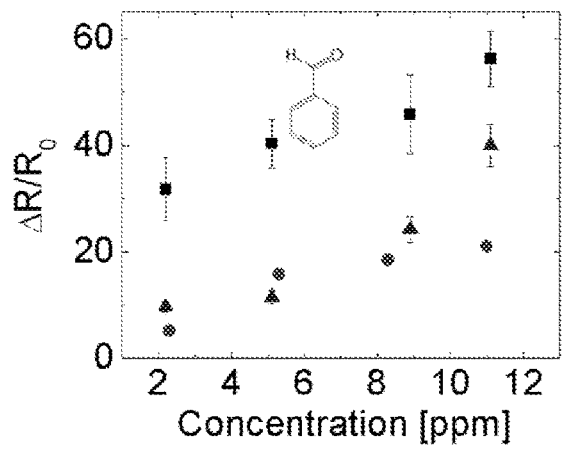
FIGS. 9A-9G: Calibration plots the sensors comprising (■) 3-ethoxythiophenol, (●) hexanethiol, and (▲) tert-dodecanethiol, exposed to benzaldehyde (FIG. 9A), ethylhexanol (FIG. 9B), hexane (FIG. 9C), hexanol (FIG. 9D), octane (FIG. 9E), octanol (FIG. 9F) and 3-methylbenzene (FIG. 9G) of different concentrations.
Figure 9B:
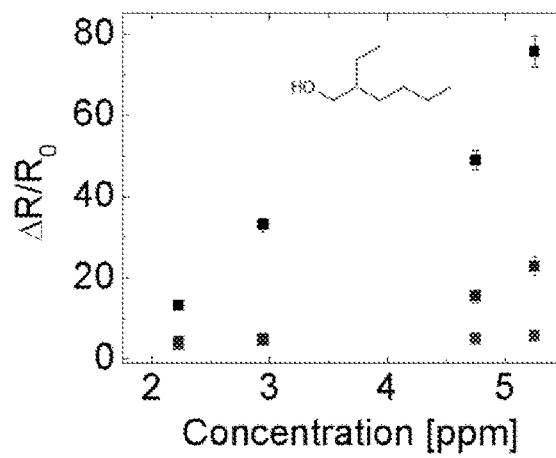
Figure 9C:
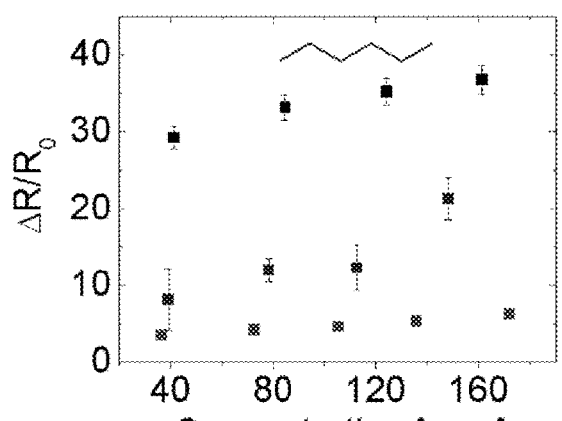
Figure 9D:
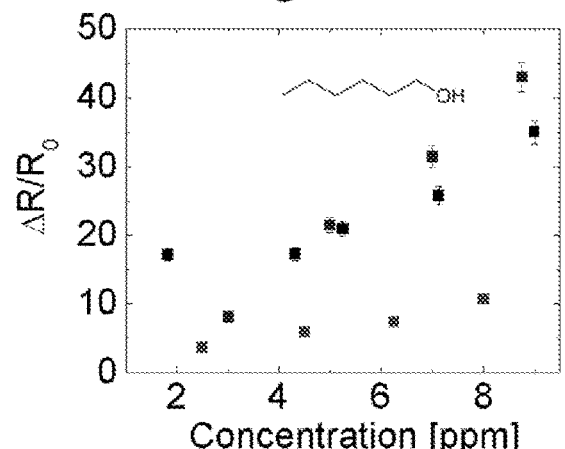
Figure 9E:
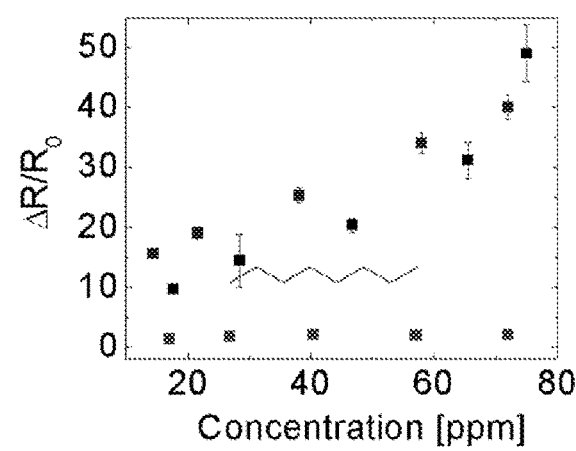
Figure 9F:
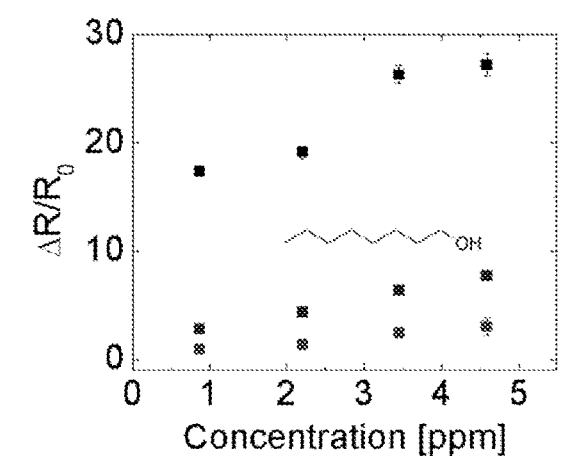
Figure 9G:
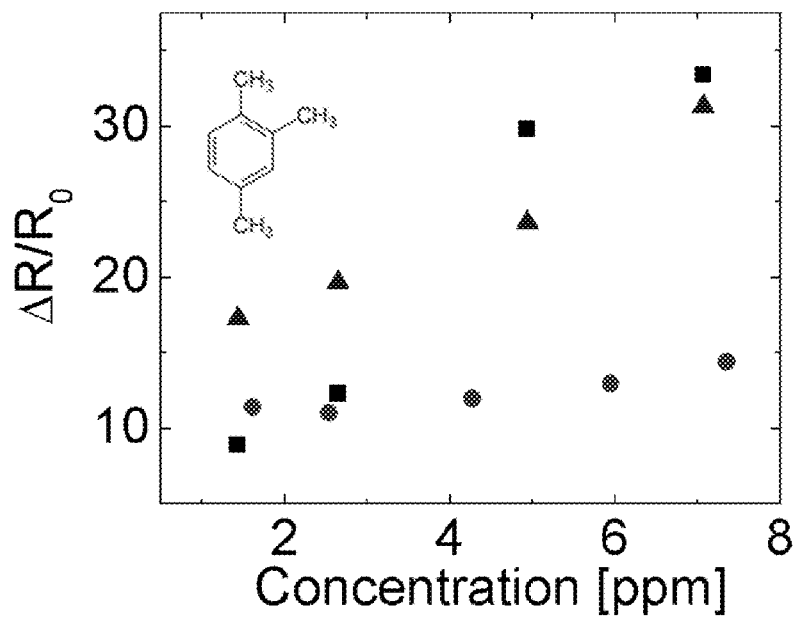

12 hours after the Y1-cut, the analyte sensing sensitivity of sh-chemiresistor was substantially unchanged (FIG. 8A, curve 2). An additional cut was applied to the sh-electrode at the same position (additional Y1 cut), which led to the decrease of about 30-40% in the analyte sensing sensitivity (FIG. 8A, curve 3). The X-cut (FIG. 8B, curve 4) did not affect the analyte sensitivity of the sh-chemiresistor, since it left an additional pathway for electrical conduction.

A platform unit comprising AuNPs capped with three different ligands, including 3-ethoxythiophenol, hexanethiol, and tert-dodecanethiol, was exposed to seven different VOCs (Table 1). Binding process of the VOCs was reversible for all VOCs and resistance change increased at higher analyte concentration (FIGS. 9A-9G). Without wishing to being bound by theory or mechanism of action, it is contemplated that the resistance change is due to the VOC adsorption on the ligands of AuNPs, which leads to the increase in the resistance between adjacent AuNPs. The sh-chemiresistors were more sensitive to polar VOCs, such as, for example, hexanol and octanol, since these VOCs affect not only the AuNP layers but also the self-healing polymeric substrate. Without further wishing to being bound by theory, it is assumed that hydrogen bonds are easily formed between polar VOCs and the self-healing polymer, causing polymer swelling, which increases the distance of AuNPs of the adjacent layers.

depicted as curve 3). Between them, resistance versus temperature was linear in the case of electrode-cut, but not for AuNP-cut. To explain nonlinearity in the second case, this may be due to strong induction of healing of the sh-AuNP film from 30° C. (squares in FIG. 10, also depicted as curve 3).

It is appreciated by persons skilled in the art that the present invention is not limited by what has been particularly shown and described hereinabove. Rather the scope of the present invention includes both combinations and sub-combinations of various features described hereinabove as well as variations and modifications. Therefore, the invention is not to be constructed as restricted to the particularly described embodiments, and the scope and concept of the invention will be more readily understood by references to the claims, which follow.

The invention claimed is:

1. A self-healing platform unit for pressure and analyte sensing, the platform unit comprising:
    a self-healing substrate comprising a dynamically cross-linked polymer comprising polymeric chains, comprising a poly(urea-urethane), and crosslinking bridges;
    at least one self-healing electrode comprising a non-crosslinked polymer and metal microparticles dispersed therein, wherein the at least one self-healing electrode is deposited on the substrate; and
    at least one sensor comprising metal nanoparticles capped with an organic coating, wherein the at least one sensor is deposited on the substrate and is in electric contact with the at least one self-healing electrode.

2. The self-healing platform unit according to claim 1, wherein the volume ratio between the metal microparticles and the non-crosslinked polymer is from about 1:15 to about 1:2.

TABLE 1

Sensitivity and limit of detection (LOD) of the sh-chemiresistor using three different organic-capped AuNPs, at signal/noise = 3, to seven different VOCs.

| VOC | 3-Ethoxythiophenol | | Hexanethiol | | Tert-dodecanethiol | |
| --- | --- | --- | --- | --- | --- | --- |
| | Sensitivity [ppm$^{-1}$] | LOD [ppm] | Sensitivity [ppm$^{-1}$] | LOD [ppm] | Sensitivity [ppm$^{-1}$] | LOD [ppm] |
| Benzaldehyde | 2.60 ± 0.81 | 0.13 | 2.28 ± 0.29 | 0.09 | 2.09 ± 0.10 | 1.26 |
| Hexane | 0.06 ± 0.02 | 5.09 | 0.11 ± 0.04 | 4.69 | 0.02 ± 0.00 | 30.28 |
| Hexanol | 3.52 ± 0.37 | 0.35 | 6.08 ± 0.26 | 0.05 | 1.15 ± 0.08 | 2.21 |
| Ethyl hexanol | 17.35 ± 0.89 | 0.02 | 4.32 ± 0.47 | 0.08 | 0.60 ± 0.09 | 1.53 |
| Octane | 0.43 ± 0.03 | 2.62 | 0.42 ± 0.03 | 1.97 | 0.02 ± 0.00 | 146.82 |
| Octanol | 2.88 ± 0.24 | 0.12 | 1.36 ± 0.06 | 1.29 | 0.08 ± 0.03 | 17.20 |
| Trimethylbenzene | 4.76 ± 0.88 | 0.29 | 2.43 ± 0.31 | 0.13 | 0.55 ± 0.11 | 1.50 |

Example 5—Capability after Temperature Changes

Figure 10:
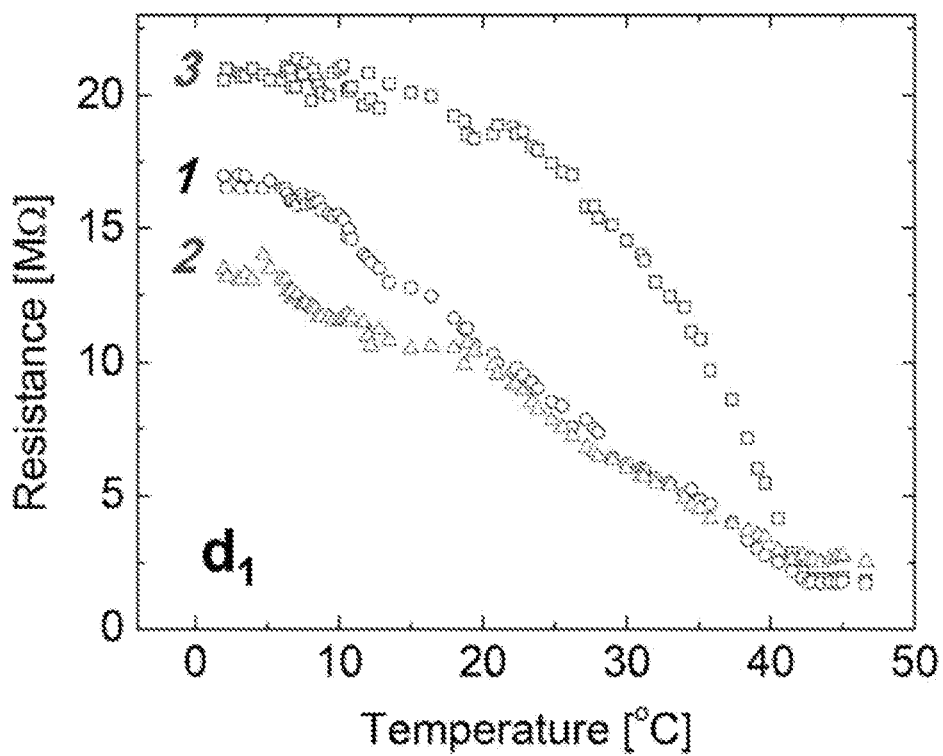
FIG. 10: Temperature-dependence of resistance of the sensor experiments (●) before and (▲) after electrode-cut, and (■) AuNP-cut.

As the change in temperature is an important aspect in biological and clinical management, the final capability of the sensor was tested after temperature changes. The results are shown in FIG. 10. This feature was based on the increase in the conductivity of the induced sh-AuNP film with elevated temperatures, which is probably due to an electron-hopping mechanism. It had a wide linear temperature range of 10-42° C. at a sensitivity of ≈0.41 MΩ° C.$^{-1}$ (circles in FIG. 10, also depicted as curve 1). At this resolution, temperature changes can be detected down to 0.1° C. Advantageously, this sensor retained its sensitivity to temperature after electrode-cut (triangles in FIG. 10, also depicted as curve 2) and AuNPcut (squares in FIG. 10, also 3. The self-healing platform unit according to claim 1, wherein the crosslinking bridges comprise disulfide moieties.

4. The self-healing platform unit according to claim 1, wherein the poly(urea-urethane) comprises a polyether backbone segment, having a molecular weight of at least about 2000 g/mole.

5. The self-healing platform unit according to claim 4, wherein the polyether is polypropylene glycol.

6. The self-healing platform unit according to claim 1, wherein the self-healing substrate has a thickness ranging from about 0.5 to about 10 mm.

7. The self-healing platform unit according to claim 1, wherein the non-crosslinked polymer comprises a polyurethane having a molecular weight in the range of about 100 g/mole to about 500 g/mole.

8. The self-healing platform unit according to claim 7, wherein said polyurethane is a polyurethane diol comprising a backbone selected from the group consisting of polyolefin, polyester, polyacrylate, polyvinylchloride, polystyrene, polybutadiene, and combinations thereof.

9. The self-healing platform unit according to claim 1, wherein the metal microparticles are selected from the group consisting of Ag, Ni, Cu, Au, Pt, Al, and combinations thereof, wherein the metal microparticles have a mean particles size ranging from about 1 μm to about 20 μm.

10. The self-healing platform unit according to claim 9, wherein said metal microparticles are Ag microparticles.

11. The self-healing platform unit according to claim 1, wherein the metallic nanoparticles are arranged in a film configuration, wherein the film has a thickness ranging from about 1 nm to about 500 nm.

12. The self-healing platform unit according to claim 1, wherein the metal nanoparticles are selected from the group consisting of Au, Ag, Ni, Co, Pt, Pd, Cu, Al, Zn, Fe, and combinations thereof or, wherein the metal nanoparticles are metal alloys selected from the group consisting of Au/Ag, Au/Cu, Au/Ag/Cu, Au/Pt, Au/Pd, Au/Ag/Cu/Pd, Pt/Rh, Ni/Co, and Pt/Ni/Fe.

13. The self-healing platform unit according to claim 1, wherein the organic coating comprises compounds selected from the group consisting of alkylthiols, arylthiols, alkylarylthiols, alkylthiolates, ω-functionalized alkanethiolates, arenethiolates, (γ-mercaptopropyl)tri-methyloxysilane, dialkyl disulfides and combinations and derivatives thereof.

14. The self-healing platform unit according to claim 1, wherein the at least one sensor is configured in a form selected from the group consisting of a capacitive sensor, a resistive sensor, a chemiresistive sensor, an impedance sensor, a field effect transistor sensor, a strain gauge and combinations thereof.

15. The self-healing platform unit according to claim 1, wherein the at least one sensor is configured to detect an analyte adsorption thereon and to generate a signal in response thereto, wherein the analyte is a volatile organic compound (VOC) selected from the group consisting of benzaldehyde, hexane, hexanal, ethyl hexanol, octane, octanol, trimethylbenzene, and combinations thereof.

16. The self-healing platform unit according to claim 1, wherein the self-healing substrate is substantially flexible and the at least one sensor is configured to generate an electrical signal which is proportional to the amount of deflection of the substantially flexible substrate.

17. The self-healing platform unit according to claim 1, wherein the at least one sensor comprises dual pressure and analyte sensing sensitivities.

18. The self-healing platform unit according to claim 1, integrated on electronic or artificial skin surface.

19. A method for fabricating the self-healing platform unit according to claim 1, the method comprising:
   a. preparing the self-healing substrate;
   b. preparing a self-healing electrically conductive paste;
   c. depositing the self-healing electrically conductive paste on the substrate, thereby obtaining the at least one self-healing electrode; and
   d. depositing the at least one sensor on the substrate, wherein the at least one sensor is in electric contact with the at least one self-healing electrode.

20. The method according to claim 19, wherein the step of preparing the self-healing substrate comprises mixing 4-aminophenyl disulfide with poly(propylene glycol), tolylene 2,4-diisocyanate terminated.

21. The method according to claim 19, wherein the step of preparing the self-healing electronically conductive paste comprises dispersing metal microparticles in a polyurethane diol solution and degassing under vacuum for at least about 15 minutes.

22. The method according to claim 21, wherein the step of depositing the at least one sensor comprises applying a solution comprising the metal nanoparticles capped with an organic coating, wherein the concentration of said metal nanoparticles in the solution is at least about 30 mg/mL.

* * * * *